(12) United States Patent
Dai et al.

(10) Patent No.: US 8,787,428 B2
(45) Date of Patent: Jul. 22, 2014

(54) SOFT FORWARDING FOR COOPERATIVE WIRELESS COMMUNICATION

(75) Inventors: Gao Yang Dai, Hong Kong (CN); Wai Ho Mow, Hong Kong (CN)

(73) Assignee: Dynamic Invention LLC, Victoria, Mahe (SC)

(*) Notice: Subject to any disclaimer, the term of this patent is extended or adjusted under 35 U.S.C. 154(b) by 363 days.

(21) Appl. No.: 13/107,603

(22) Filed: May 13, 2011

(65) Prior Publication Data

US 2012/0140796 A1 Jun. 7, 2012

Related U.S. Application Data

(60) Provisional application No. 61/418,811, filed on Dec. 1, 2010.

(51) Int. Cl.
*H04B 7/15* (2006.01)
*H04L 25/20* (2006.01)

(52) U.S. Cl.
USPC .............................. 375/211; 375/341; 370/315

(58) Field of Classification Search
CPC .......... H04B 7/14; H04B 7/15; H04B 7/1858; H04B 7/022; H04B 7/026; H04B 7/15521; H04B 7/15557; H04B 7/15592; H04L 1/0077
USPC .................. 375/211, 259, 340, 341; 370/315; 455/7; 340/425.1
See application file for complete search history.

(56) References Cited

U.S. PATENT DOCUMENTS

| | | | |
|---|---|---|---|
| 2007/0217541 A1* | 9/2007 | Liu et al. | 375/279 |
| 2009/0036051 A1* | 2/2009 | Horiuchi et al. | 455/7 |
| 2010/0088568 A1* | 4/2010 | Larsson | 370/328 |
| 2010/0110967 A1* | 5/2010 | Sartori et al. | 370/315 |
| 2011/0126077 A1* | 5/2011 | Park et al. | 714/755 |

OTHER PUBLICATIONS

Ahlswede, et al., "Network information flow". IEEE Transactions on Information Theory, 46(4):1204-1216, 2000.
Ahmed, et al., "Throughput Gains Using Rate and Power Control in Cooperative Relay Networks". IEEE Transactions on Communications, 55(4):656-660, 2007.
Anghel, et al., "Exact symbol error probability of a Cooperative network in a Rayleigh-fading environment". IEEE Transactions on Wireless Communications, 3(5):1416-1421, 2004.

(Continued)

*Primary Examiner* — Betsy Deppe
(74) *Attorney, Agent, or Firm* — Amin, Turocy & Watson, LLP

(57) ABSTRACT

Providing for soft error decoding for wireless relay networks is described herein. By way of example, a wireless node in a wireless relay network can receive a direct signal from a source node, and can receive a forwarded version of the source signal from a relay node. An information flag included with the forwarded version is referenced to determine whether the relay node properly received the source signal. If the relay node received the source signal with an error and a destination node received the source signal with an error, soft decision information can be generated from the forwarded version of the source signal and employed to assist with decoding of the source signal at the destination node. The soft-decision information improves end-to-end performance of the wireless relay system, while mitigating complexity and bandwidth requirements for the relay node as compared with conventional signal decoding techniques.

35 Claims, 12 Drawing Sheets

(56) References Cited

OTHER PUBLICATIONS

Avestimehr, et al., "Outage Capacity of the Fading Relay Channel in the Low-SNR Regime". IEEE Transactions on Information Theory, 53(4):1401-1415, 2007. Last accessed Feb. 24, 2011, 33 pages.
Bletsas, et al., "Cooperative Communications with Outage-Optimal Opportunistic Relaying". IEEE Transactions on Wireless Communications, 6(9):3450-3460, 2007. Last accessed Feb. 24, 2011, 11 pages.
D. G. Brennan, "Linear Diversity Combining Techniques". Proceedings of the Institute of Radio Engineers, 47(6), 1959, pp. 1075-1102.
Bui, et al., "A decode and forward cooperation scheme with soft relaying in wireless communication". IEEE 8th Workshop on Signal Processing Advances in Wireless Communications, 2007. SPAWC 2007., pp. 1-5, 2007.
Cover, et al., "Capacity theorems for the relay channel". IEEE Transactions on Information Theory, 25(5):572-584, 1979. Last accessed Feb. 24, 2011, 13 pages.
Gesbert, et al., "From theory to practice: an overview of MIMO space-time coded wireless systems". IEEE Journal on Selected Areas in Communications, 21(3):281-302, 2003. Last accessed Feb. 24, 2011, 22 pages.
Gomadam, et al., "Optimizing Soft Information in Relay Networks". Fortieth Asilomar Conference on Signals, Systems and Computers, 2006, pp. 18-22, 2006. Last accessed Feb. 24, 2011, 5 pages.
Gunduz, et al., "Opportunistic cooperation by dynamic resource allocation". IEEE Transactions on Wireless Communications, 6(4):1446-1454, 2007. Last accessed Feb. 24, 2011, 24 pages.
Hagenauer, et al., "Rate-compatible punctured convolutional codes (RCPC codes) and their applications". IEEE Transactions on Communications, 36(4):389-400, 1988.
Hagenauer, et al., "Iterative decoding of binary block and convolutional codes". IEEE Transactions on Information Theory, 42(2):429-445, 1996. Last accessed Feb. 24, 2011, 17 pages.
Hasna, et al., "End-to-end performance of transmission systems with relays over Rayleigh-fading channels". IEEE Transactions on Wireless Communications, 2(6):1126-1131, 2003.
Hausl, et al., "Iterative Network and Channel Decoding for the Two-Way Relay Channel". IEEE International Conference on Communications, 2006. ICC '06., pp. 1568-1573, 2006. Last accessed Feb. 24, 2011, 6 pages.
Hunter, et al., "Cooperative diversity through coding". pp. 220, 2002.
Hunter, et al., "Diversity through coded cooperation". IEEE Transactions on Wireless Communications, 5 (2):283-289, 2006. Last accessed Feb. 24, 2011, 7 pages.
Hunter, et al., "Outage analysis of coded cooperation". IEEE Transactions on Information Theory, 52(2):375-391, 2006. Last accessed Feb. 24, 2011, 17 pages.
Laneman, et al., "Cooperative diversity in wireless networks: Efficient protocols and outage behavior". IEEE Transactions on Information Theory, 50(12):3062-3080, 2004. Last accessed Feb. 24, 2011, 19 pages.
Laneman, et al., "Distributed space-time-coded protocols for exploiting cooperative diversity in wireless networks". IEEE Transactions on Information Theory, 49(10):2415-2425, 2003. Last accessed Feb. 24, 2011, 11 pages.
Laneman, et al., "An efficient protocol for realizing cooperative diversity in wireless networks". IEEE International Symposium on Information Theory, 2001, pp. 294, 2001. Last accessed Feb. 24, 2011, 1 page.
Li, et al. "Low complexity iterative decoding for bit-interleaved coded modulation". IEEE Transactions on Wireless Communications, 5(8):1966-1970, 2006.
Li, et al. "Distributed Turbo Coding With Soft Information Relaying in Multihop Relay Networks". IEEE Journal on Selected Areas in Communications, 24(11):2040-2050, 2006. Last accessed Feb. 24, 2011, 11 pages.
E. C. Van Der Meulen, "Three-terminal communication channels". Adv. Appl. Probab., 3:120-154, 1971.
Patel, et al., "Statistical properties of amplify and forward relay fading channels". IEEE Transactions on Vehicular Technology, 55(1):1-9, 2006.
J. Pierce, "Approximate Error Probabilities for Optimal Diversity Combining". IEEE transactions on Communications Systems, 11(3):352-354, 1963.
Qi, et al., "Performance Evaluation of Soft Decode-and-Forward in Fading Relay Channels". IEEE Vehicular Technology Conference, 2008., pp. 1286-1290, 2008. Last accessed Feb. 24, 2011, 5 pages.
Ribeiro, et al., "Symbol error probabilities for general Cooperative links". IEEE Transactions on Wireless Communications, 4(3):1264-1273, 2005. Last accessed Feb. 24, 2011, 10 pages.
Sendonaris, et al., "User cooperation diversity. Part I. System description". IEEE Transactions on Communications, 51(11):1927-1938, 2003. Last accessed Feb. 24, 2011, 12 pages.
Sendonaris, et al., "User cooperation diversity. Part II. Implementation aspects and performance analysis". IEEE Transactions on Communications, 51(11):1939-1948, 2003. Last accessed Feb. 24, 2011, 10 pages.
Sneessens, et al., "Soft Decode and Forward Improves Cooperative Communications". IEE 6th International Conference on 3G and Beyond, 2005, pp. 1-4, 2005. Last accessed Feb. 24, 2011, 4 pages.
Tang, et al., "Cross-layer resource allocation over wireless relay networks for quality of service provisioning". IEEE Journal on Selected Areas in Communications, 25(4):645-656, 2007. Last accessed Feb. 24, 2011, 12 pages.
Wang, et al., "On the capacity of MIMO relay channels". IEEE Transactions on Information Theory, 51(1):29-43, 2005. Last accessed Feb. 24, 2011, 15 pages.
Zeitler, et al., "On Quantizer Design for Soft Values in the Multiple-Access Relay Channel". IEEE International Conference on Communications, 2009., pp. 1-5, 2009. Last accessed Feb. 24, 2011, 5 pages.
Zhang, et al., "Performance Analysis of Multiple-Relay Decode-and-Forward Cooperation System". TENCON 2005 IEEE Region 10, pp. 1-6, 2005.
Zhao, et al., "Improving amplify-and-forward relay networks: optimal power allocation versus selection". IEEE Transactions on Wireless Communications, 6(8):3114-3123, 2007. Last accessed Feb. 24, 2011, 6 pages.

\* cited by examiner

SOFT FORWARDING FOR COOPERATIVE WIRELESS COMMUNICATION

CLAIM OF PRIORITY UNDER 35 U.S.C. §119

The present application for patent claims priority to Provisional Patent Application Ser. No. 61/418,811 entitled "NOVEL SOFT FORWARDING TECHNIQUE FOR COOPERATIVE COMMUNICATION," filed Dec. 1, 2010, and hereby expressly incorporated by reference herein.

TECHNICAL FIELD

The present application relates generally to cooperative wireless communication, and more particularly to providing error correction for cooperative relay wireless communication.

BACKGROUND

Wireless communication is a rapidly developing technology in the modern field of electronic communication. For instance, cellular communication systems have experienced exponential growth in recent decades, serving billions of users worldwide. In many aspects of modern social and business interaction, mobile phones have become an essential part of life in both industrial and developing segments of the world.

Mobile phones and related mobile electronic communication devices provide great convenience to consumers. As a result, wireless networks have begun gradually replacing wired networks in many homes, businesses and campuses worldwide. New applications for these devices, including sensor networks, automated highways and factories, etc., have emerged from the varied research and development in the overall field of wireless communication. Though the expansion of wireless communication and related applications has been explosive, many technical challenges remain in designing robust wireless networks that deliver sufficient performance and quality for ongoing developing applications.

Conventionally, wireless networks provide significant advantages over wired electronic communication, including convenience and portability of mobile phones, and the rapidly increasing processing technology of mobile phones. However, physical wired communication has greater bandwidth enabling greater transmission rates. One challenge for wireless networks in competing with physical wired networks is increasing bandwidth of wireless communication. Another challenge for wireless communication is multi-path fading that causes mis-detection of received signals due to variations in signal power.

Various recent advancements in wireless technology have provided improvement in data rates and detection probability for wireless communication. For instance, multiple-input, multiple-output (MIMO) systems have been developed to improve spectral efficiency of wireless communication through spatial multiplexing. Robustness and reliability of wireless links are also improved by space-time coding and beamforming. Generally speaking, MIMO systems and spatial multiplexing techniques are possible with the advent of multiple radio frequency antennas into transmitters and receivers.

A widely accepted technique for mitigating negative consequences of fading channels for wireless communication is diversity technology. In many wireless networks, however, electronic devices may not be able to support multiple antennas due to size, complexity, cost, or related constraints. In this case, the benefit of MIMO communication cannot be realized for conventional devices and systems. Rather, these systems and devices commonly require alternative techniques to overcome physical hardware limitations to achieve diversity.

Relatively speaking, cooperative wireless communication is new approach in providing diversity gain to increase wireless network capacity. Cooperative communication facilitates resource sharing among single-antenna user equipment, where respective user devices can inter-communicate achieving a virtual multi-antenna array comprising multiple single antenna devices. A virtual MIMO system can be established in this fashion that can accomplish diversity transmission and diversity reception with a multi-antenna base station. Although a single antenna user equipment does not by itself achieve diversity according to this technique, by relaying signals received from another user equipment or a base station, an additional version of transmitted information can be received at a destination, achieving spatial diversity.

In cooperative communication, signal relays or signal forwarding can be performed in two general categories, including hard forwarding and soft forwarding. Hard forwarding is generally considered a conventional one, which employs hard-decision bits in cooperation. Hard-decision bits are generated, at a high-level perspective, by analyzing signal information and determining a fixed set of possible values for the signal information (generally a one or a zero in the binary context). In contrast, soft forwarding involves analyzing the signal information and generating a range of information from the signal information, for instance between the fixed set of possible values, and forwarding this range of information to a destination device.

By providing additional information about signal information, soft forwarding tends to improve end-to-end performance for wireless communication, particularly for noisy or otherwise poor wireless channels. However, soft forwarding increases complexity and processing overhead, in some cases prohibitively so. Accordingly, existing soft forwarding techniques can be limited in their applications in real-world wireless communication systems.

The above-described deficiencies of conventional wireless communication systems are merely intended to provide an overview of some of the problems of current technologies, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects of the various embodiments. This summary is not an extensive overview of the various embodiments. It is intended to neither identify key or critical elements of the various embodiments nor delineate the scope of such embodiments. Its sole purpose is to present some concepts of the various embodiments in a simplified form as a prelude to the more detailed description that is presented later.

Various aspects of the subject disclosure provide for improved error correction in cooperative wireless communication systems. A soft decoding mechanism is provided that improves end-to-end performance in a cooperative wireless communication environment, while reducing complexity of conventional soft forwarding techniques. Accordingly, the subject disclosure provides improved error correction that can be more practically implemented in conjunction with existing cooperative communication hardware.

In some aspects of the subject disclosure, a relay node can receive a source signal from a source node and employ a decode and forward technique for forwarding a version of the source signal to a destination node, providing diversity transmission to the destination node. Moreover, the relay node can include an information flag that indicates whether the received transmission was received correctly, or in error.

A destination node that receives the forwarded version can reference the information flag to determine whether the relay node correctly received the source signal. If the source signal was not correctly received at the relay node, the destination node can generate soft information from the forwarded version and employ the soft information to improve decoding of the source signal. The use of soft information at the destination node can improve decoding probability of the source signal, particularly for a poor source-relay channel. Moreover, generating soft information at the destination node reduces complexity and processing overhead at the relay node, while reducing bandwidth requirements on a relay-destination channel.

According to one or more particular aspects of the subject disclosure, soft information is generated at the destination node based on hard-coded bits extracted from a relay signal, in conjunction with reliability information of a source-relay channel. The hard-coded bits can be re-coded and re-modulated, and employed as the sign of a channel probability function for the relay signal. Moreover, channel state information provided to the destination node can be leveraged to generate a magnitude of the channel probability function for the relay signal. The channel probability function for the relay signal can be summed with channel probability information for the source signal, to generate hard-decision bits for the source signal, thereby decoding the source signal.

According to further aspects, multiple mechanisms for generating reliability information for the relay channel are provided, in conjunction with generating soft information from the relay signal. In one aspect, channel reliability can be updated to the destination node for each bit length, yielding bit-specific reliability. In another aspect, channel reliability can be updated to the destination node for each packet length, yielding packet-specific reliability. In yet another aspect, channel reliability can be updated for multiple packets, or for some predetermined time, or simply once upon channel initialization, or the like, to provide channel-specific reliability. The various aspects have differing degrees of processing and bandwidth overhead and complexity, and can be selected according to desired overhead and complexity.

According to further aspects, disclosed soft-decision decoding is utilized in conjunction with additional cooperative communication environments. According to some aspects, the subject disclosure provides soft-decision decoding in conjunction with a multiple relay system. In further aspects, the subject disclosure provides soft-decision decoding in conjunction with a cooperative coding system in which multiple user equipment nodes act as relays for each other, in transmitting information to a destination node. In still other aspects, the subject disclosure provides soft-decision error decoding in conjunction with a network coding system, in which a relay serves as a dedicated relay for respective transmissions of multiple other nodes. The soft-decision decoding can improve end to end performance in these environments relative to conventional techniques, while mitigating complexity with respect to existing soft-forwarding techniques.

The following description and the annexed drawings set forth in detail certain illustrative aspects of the various embodiments. These aspects and their equivalents are indicative, however, of but a few of the various ways in which the principles of the various embodiments may be employed, and such embodiments should thus not be limited to any particular aspect or aspects described herein. Other advantages and distinguishing features of the various embodiments will become apparent from the following detailed description when considered in conjunction with the drawings.

DETAILED DESCRIPTION

Figure 1:
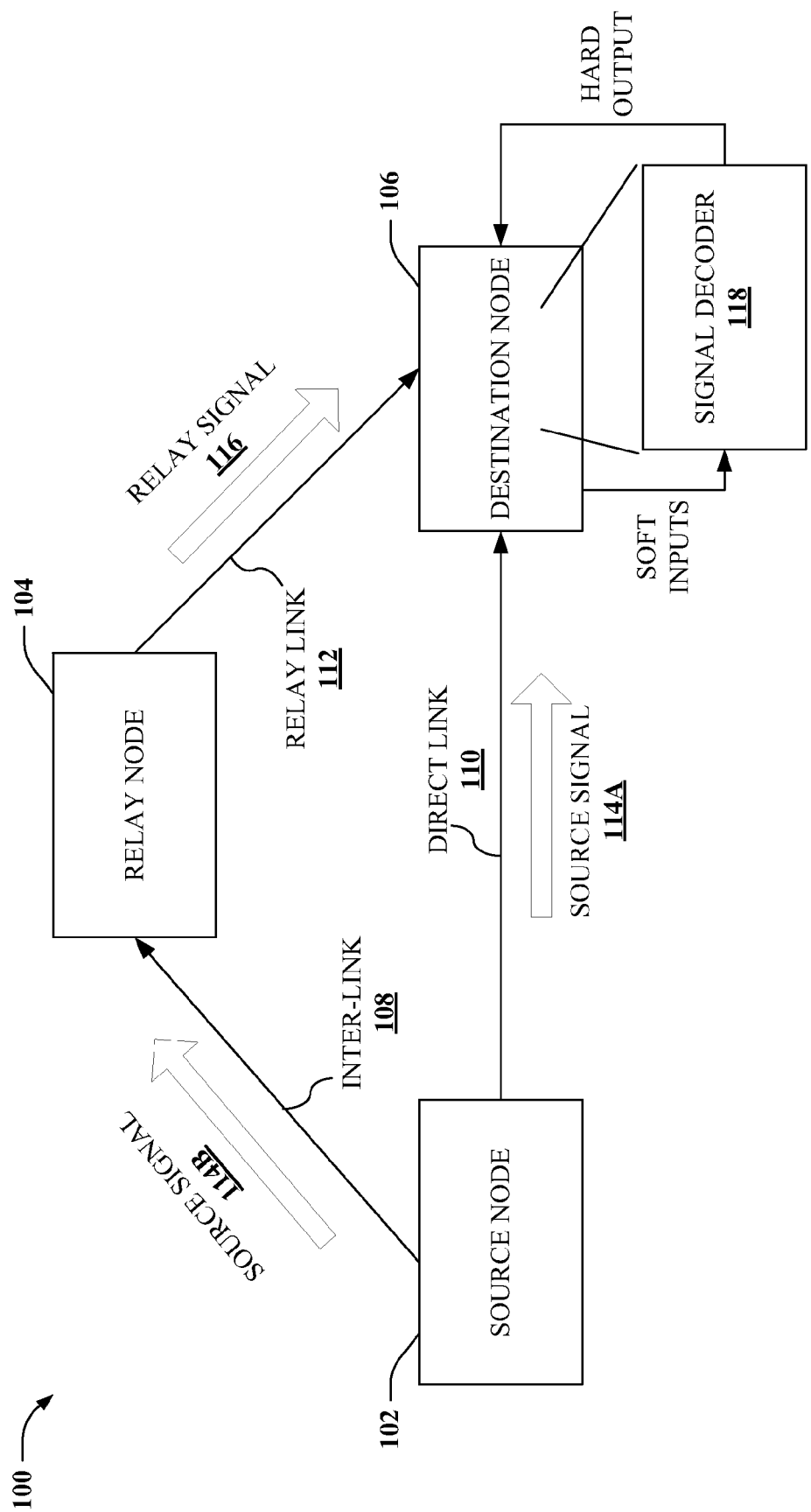
FIG. 1 illustrates a block diagram of an example cooperative communication system for wireless communication according to disclosed aspects.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments may be practiced without these specific details. In other instances, well-known structures and devices are shown in block diagram form in order to facilitate describing the various embodiments.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the various embodiments may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the various embodiments.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Cooperative wireless communication systems enable independent wireless user nodes that are configured for peer-to-peer communication, to obtain or improve spatial diversity in network communication. This can be accomplished for user nodes that, because of hardware limitations for instance (e.g., a single antenna node), are not able to transmit or receive signals in the spatial diversity context. By coordinating peer-to-peer communication, diversity gain can be achieved for user nodes, potentially improving throughput, reducing error rates, or the like, as compared with non-cooperative communication.

The cooperative communication context typically involves respective user nodes transmitting data as well as acting as a cooperative agent for one or more other user nodes. This is a different model than a traditional relay network. In the latter system, the relay is dedicated to assisting a main channel, and does not transmit its own source data (e.g., data originating at the relay). In the cooperative communication context, total system resources are generally fixed, and user nodes act as both information sources and relays. Thus, as utilized herein, the terms relay node, relay, etc., is intended to refer to a user node that can act as both information source and a relay for another node (e.g., another user node, another relay node, a base station, etc.), except where clear from context that such terms instead refer to a dedicated relay.

Several protocols exist for governing relay node behavior in the cooperative communication context. Some examples include amplify-and-forward (AF), decode-and-forward (DF), and coded cooperation (CC) protocols. For AF, a relay simply scales a received signal and transmits it to the destination. Rather than simple scaling, the relay decodes and re-encodes the received signal in sequence for the DF scheme. The CC protocol integrates cooperation in channel coding. Each of these protocols has its benefits and detriments. For instance, the AF and DF protocols tend to propagate any errors in signals it receives from a source node, to a destination node. Thus, end to end performance in AF and DF protocols tends to be poor when a source to relay channel (also referred to herein as an inter-link channel) is noisy or otherwise of poor quality (e.g., fast fading effects, excessive scattering, interference, and so on).

The following notations are utilized for descriptions of cooperative communications, which are summarized in Table 1. The terms $x_S$ and $x_R$ are signals transmitted from a source node, and a relay node, respectively. Likewise, the terms $y_{SD}$ and $y_{RD}$ represent received signals at the destination from the source and the relay, respectively (over a source to destination channel—also referred to as a direct channel, and over a relay to destination channel—also referred to herein as a relay channel, respectively). Additionally, $y_{SR}$ is the signal received at the relay from the source over a source to relay channel, or an inter-link channel. The term h denotes the fading coefficient, which represents the physical effects of attenuation and multi-path fading of a corresponding channel, where a subscript of h identifies a corresponding channel. In at least some aspects of the subject disclosure, channel fading is considered to be constant at least for a packet period, assuming a quasi-static flat fading channel. These conditions need not be applied to all disclosed aspects, however. In addition to the foregoing, n is an additive white Gaussian noise (AWGN) metric with two-sided power spectral density of $2\sigma_n^2$. Moreover, instantaneous signal to noise ratio (SNR), $\gamma$, and average SNR $\bar{\gamma}$:

$$\gamma = |h|^2 E_b/N_0$$

$$\bar{\gamma} = \sigma_h^2 E_b/N_0$$

A more detailed discussion of the DF protocol will follow as a prelude to aspects of this protocol that are employed as part of various innovative aspects of the subject disclosure. According to the DF protocol, a relay node receives a signal from a source node, decodes the signal, and then re-encodes and retransmits the received signal. The source signal is received from the source node over an inter-link channel, and is transmitted to the destination node over a relay channel.

Where multiple user nodes are acting as their own information source and as a relay for a neighboring user node, each user can transmit its own bits in a first time frame, according to the DF protocol. In a second time frame, each user node detects its neighbor's bits and retransmits them to a destination node. If the relay successfully decodes the source-relay signal (and uses the same code book as the source node), the relay signal (forwarded by the relay to the destination) is the same as the source signal (transmitted to the destination by the source).

Upon receiving the source signal, $y_{SR}$ is decoded at the relay to generate an estimation of K information bits: ú. By re-encoding ú, the relay obtains a version of the transmitted symbol with N bits $x_R$. Thus, according to the DF protocol, the relay signal transmitted over the relay channel results in a symbol $y_{RD}$ received at the destination as:

$$y_{RD}(k)=h_{RD}(k)x_R(k)+n_{RD}(k) \quad (1)$$

where k is a transmitted symbol. DF signaling has the advantage of simplicity and adaptability to channel conditions. Decoding and re-encoding a signal involves minimum processing overhead at the relay, and comparable system bandwidth to other diversity arrangements. But one intrinsic disadvantage of the conventional DF protocol is that end-to-end performance on the DF protocol is limited by the inter-link condition. Where the inter-link is favorable, the relay can decode the source's information and forward a replica to the destination. When the inter-link condition is poor, however, the forwarded copy can negatively impact decoding of the source signal at the destination. Upon requiring the relay to decode the source's signal successfully, the achievable rate of this DF protocol is:

$$R_{DF}=\tfrac{1}{2}\min\{\log(1+\gamma_{SR}),\log(1+\gamma_{SD}+\gamma_{RD})\} \quad (2)$$

$$R_{DF} = \frac{1}{2}\min\{\log(1 + \gamma_{SR}), \log(1 + \gamma_{SD} + \gamma_{RD})\} \quad (2)$$

Moreover, this DF protocol is capped at the diversity gain order of one. As compared with the AF protocol for instance (which can achieve the full diversity order of two), the DF protocol under-performs in terms of error probability in a high SNR region. In sum, the inter-link condition imposes a fundamental limit on the performance of the DF protocol, limiting its performance and efficiency.

One proposal to address the problem of the DF protocol is called the selective DF protocol (e.g., see J. N. Laneman, D. N. C. Tse, and G. W. Wornell, "Cooperative Diversity in wireless networks: Efficient protocols and outage behavior," *IEEE Transactions on Information Theory*, vol. 50, no. 12, pp. 3062-3080, 2004, incorporated herein by reference). The selective DF protocol causes the relay node to decode and forward a source signal if the source signal $y_{SR}$ is decoded successfully at the relay node. When the relay node fails to property decode the source signal, it reverts to non-cooperative mode and does not forward the received signal. This mitigates propagation of errors from the relay node. The selective DF protocol can achieve the full diversity order. The non-selective DF protocol discussed above is referred to hereinafter as conventional DF, to distinguish it from the selective DF protocol and other DF protocols that limit propagation of data received in error at the relay node.

In perspective of diversity order, the AF protocol is superior to the conventional DF, achieving the full diversity order of two, whereas the conventional DF protocol achieves a diversity order of one. The limitation of the conventional DF protocol is primarily due to channel conditions of the inter-link channel, where a poor environment can cause error propagation to the destination node. Thus, the signal regenerative aspects of the conventional DF protocol (decoding, and then re-encoding a received signal) are both advantageous and disadvantageous, depending significantly on inter-link channel conditions.

In addition to the hard-relaying strategies of AF, DF, and CC, other cooperative strategies called soft relaying or soft forwarding. Soft forwarding incorporates signal regeneration and utilization of soft information (e.g., a range of information indicative of bit values, rather than a hard determination of a bit value). Significant performance improvements can be achieved with soft forwarding strategies, even in the presence of a poor inter-link channel.

One mechanism for addressing the inter-link problem in the conventional DF protocol is the soft DF protocol. In the soft DF protocol, a relay node performs soft decoding of a received signal and re-encodes the signal, while incorporating reliability information pertaining to the forwarded signal within a relay transmission sent to a destination node. The soft operations at the relay can improve system performance, but they also introduce extra processing overhead and complexity at the relay node, and potentially increased bandwidth requirements on the relay channel (e.g., due to the bandwidth overhead of the reliability information). In practice, relay nodes are often designed to implement simple digital signal processing operations. Other soft DF schemes optimize soft information relaying to improve error performance, but require complex calculation of soft information at the relay and decoding algorithms at the destination. Thus, although the soft DF protocols exhibit improved end to end error performance compared to hard decision cooperation schemes, the soft DF protocols may not be practical considering hardware or software limitations of typical user nodes, making them impractical in many cooperative communication wireless environments.

Referring now to the drawings, FIG. 1 illustrates a block diagram of an example cooperative communication wireless system 100 (system 100) according to aspects of the subject disclosure. System 100 includes a source node 102, a relay node 104 and a destination node 106. In general, source node can comprise a user equipment (e.g., mobile handset, fixed or portable computer with a wireless modem or like device, etc.), or a wireless network interface such as a base station, wireless access point, and so on. Similarly, destination node 106 can comprise a user equipment or a wireless network interface. Relay node 104 is generally a user equipment, whether fixed or mobile. Generally, at least two of source node 102, relay node 104 or destination node 106 are user equipment and one such node is a network interface node, although the subject disclosure is not limited to this particular embodiment.

As depicted, source node 102 is communicatively coupled with relay node 104 via an inter-link channel 108 (or inter-link), and with destination node 106 via a direct-link channel 110 (or direct-link). Further, relay node 104 is communicatively coupled with destination node 106 via a relay link channel 112 (or relay-link). In operation, source node 102 transmits a source signal 114A, 114B, which is received by relay node 104 over inter-link channel 108, and by destination node 106 over direct-link channel 110. Relay node 104 employs a forwarding protocol to receive and re-transmit a relay signal 116 to destination node 106 over relay-link channel 112. This re-transmitted relay signal 116 is also referred to as a forwarded version of source signal 114B. If relay node 104 accurately receives source signal 114B, then relay signal 116 is an accurate copy of source signal 114B, providing two independent transmissions of source signal 114A to be received at destination node 106. However, where relay node 104 receives source signal 114B with error, relay signal 116 will not be an exact copy of source signal 114A.

In various aspects of the subject disclosure, a soft decoding protocol is provided for improving end to end error mitigation for cooperative wireless communications, having minimal complexity for relay node 104. The soft decoding protocol can be implemented as part of destination node 106, or can be included in a module incorporated as part of destination node 106 (e.g., an add-on module, a module incorporated with destination node 106 during manufacturing, a software or hardware module, a firmware module, or a suitable combination thereof). For destination node 106 of system 100, the module is depicted as a signal decoder 118.

In operation, inter-link channel 108, direct-link channel 110 and relay-link channel 112 are half duplex, incorporating orthogonal access (e.g., based on a time division duplex protocol, or the like). The term $x_i$, $i \in \{S,R\}$ is a transmitted signal, and the term $y_i$, $i \in \{R,D\}$ is a received signal. Further, an AWGN flat fading channel is assumed, with $h_i$, $i \in \{SD,SR,RD\}$ and $n_i$, $i \in \{SD,SR,RD\}$ representing the channel fading coefficients and noise, respectively, for various channels. The instantaneous and average SNR are as follows:

$$\gamma_i = |h_i|^2 E_b/N_0 \quad (3)$$

$$\bar{\gamma}_i = \sigma_{h_i}^2 E_b/N_0 \quad (4)$$

Based on the DF cooperative protocol, transmissions on inter-link channel 108, direct-link channel 110 and relay-link channel 112 can be expressed as:

$$y_{SD}(k) = h_{SD}(k)x_S(k) + n_{SD}(k) \quad (5)$$

$$y_{SR}(k) = h_{SR}(k)x_S(k) + n_{SR}(k) \quad (6)$$

$$y_{RD}(k) = h_{RD}(k)x_S(k) + n_{RD}(k) \quad (7)$$

where k identifies a particular transmitted bit. For simplicity of calculation, it will be assumed that the transmitted signal has a unit power; however, this assumption is for illustrative purposes and is not intended to limit the scope of the subject disclosure, as other transmit powers can be employed. If relay node 104 correctly decodes source signal 114B, relay signal 116 is the same as source signal 114B, and thus $x_R = x_S$. In this case, signal decoder 118 can employ a maximum ratio combining (MRC) algorithm to decode symbols received at destination node 106, where the MRC algorithm has the form $a_1 y_{SD} + a_2 y_{RD}$, achieving a full diversity order of two. From the Cauchy-Schwartz inequality, $a_i = h_i/N_i$, (where $h_i$ is the channel fading coefficient of the $i^{th}$ channel, and $N_i$ the number of bits transmitted over the $i^{th}$ channel) and the effective SNR for the single-relay network of system 100 after executing the MRC algorithm is:

$$\gamma_{MRC} = \frac{(h_{SD}^2/N_{SD} + h_{RD}^2/N_{RD})^2}{2(h_{SD}^2/N_{SD} + h_{RD}^2/N_{RD})} \quad (8)$$

$$= \frac{h_{SD}^2/N_{SD} + h_{RD}^2/N_{RD}}{2}$$

When relay node 104 fails to properly decode source signal 114B (e.g., $y_{SR}$), it is assumed that $x_R \neq x_S$. Accordingly, the MRC algorithm is not utilized by signal decoder 118, to avoid errors contained in $x_R$ from corrupting signal detection at destination node 106.

Upon receiving source signal 114B, relay node 104 can employ an error checking technique to determine whether symbols are received from source node 102 in error. As one example, a cyclic redundancy check (CRC) code can be employed for determining whether symbols are received in error. In at least one aspect of the subject disclosure, a genie-aided algorithm can be utilized as an idealized CRC for simulation, as one example, or simulating a baseline error rate, as another example.

If an error is found, relay node 104 can decode and then re-encode and modulate received symbol $y_{SR}$, similar to the DF protocol discussed above. In addition, relay node 104 can include an information flag within relay signal 116, indicating whether the received symbol (or a received packet, or set of received packets, etc.) are received with errors. Relay signal 116 is received by destination node 106, along with source signal 114A. A CRC is performed by destination node 106 on relay signal 116 and source signal 114A. If source signal 114A is received with error, destination node 106 analyzes the information flag within relay signal 116 to determine whether relay node 104 received source signal 114B in error. If source signal 114B was received correctly at relay node 104, then relay signal 116 is an accurate copy of source signal 114A, and destination node 106 can employ the MRC algorithm utilizing $y_{SD}$ and $y_{RD}$ as inputs, as discussed above. However, if source signal 114B was received in error at relay node 104, destination node 106 can generate soft information from $y_{RD}$. This soft information is input to signal decoder 118 to improve decoding of $y_{SD}$, as is described in more detail below.

TABLE 1

Symbol Notation

| Symbol | Description |
| --- | --- |
| u | Information symbol |
| x | Modulated transmitted symbol |
| Y | Corrupted received symbol |
| H | Fading coefficient |
| $\sigma_n^2$ | Noise variance |
| E{.} | Statistic expectation |
| Q{.} | Q-function |
| L{.} | Log likelihood ratio value |
| Log{.} | Natural logarithm |
| |.| | Magnitude of an element |
| min{.} | Minimization |
| max{.} | Maximization |
| Pr{.} | Probability |
| R{.} | Real number |
| Sign{.} | Sign value |
| Rel{.} | Reliability value |

Figure 2:
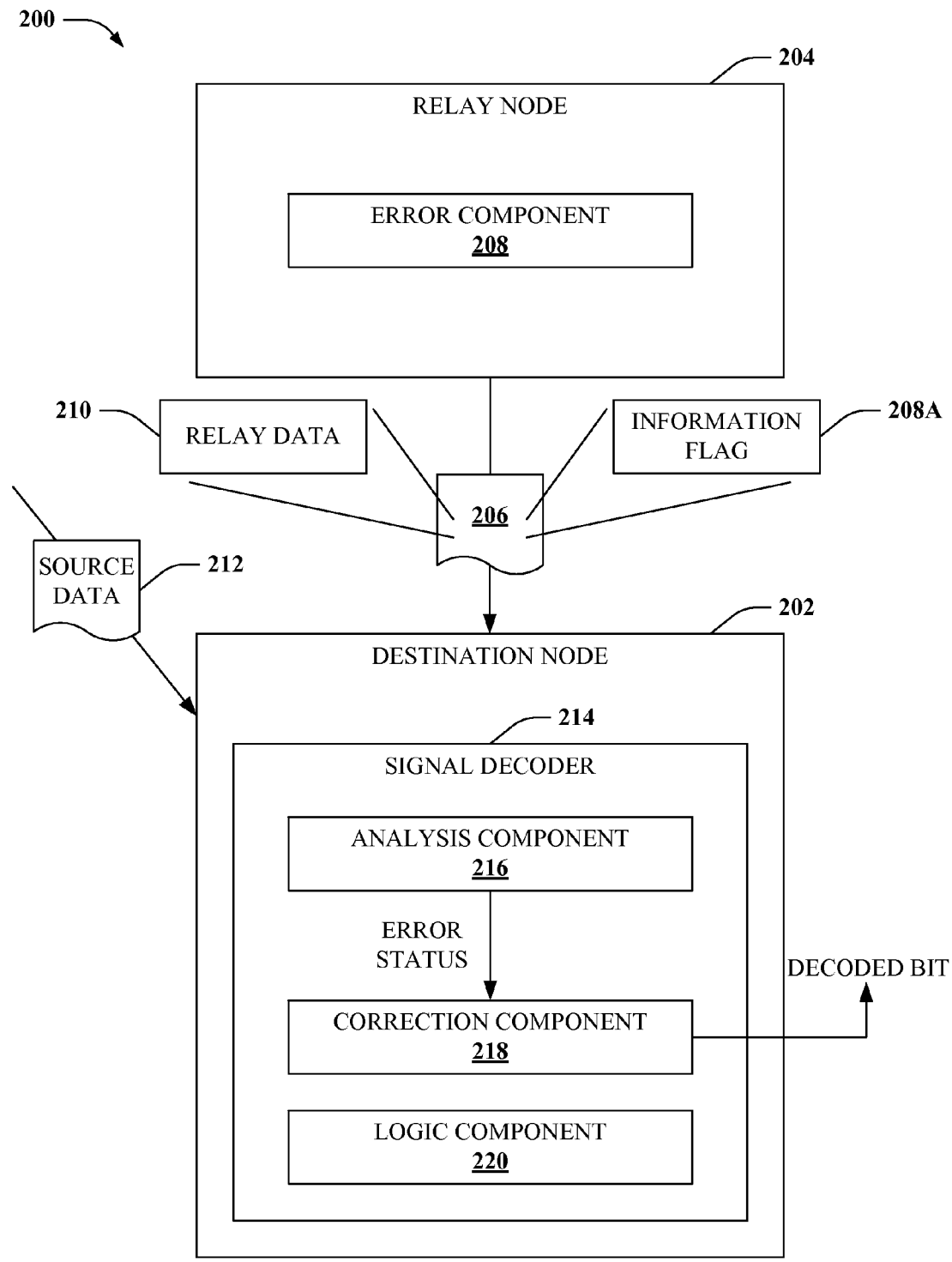
FIG. 2 depicts a block diagram of a sample wireless communication employing soft-decision decoding according to one or more further aspects.

FIG. 2 illustrates a block diagram of an example cooperative wireless system 200 (system 200) according to additional aspects of the subject disclosure. System 200 can be configured to employ soft decoding to improve error correction and overall end to end performance of system 200. Moreover, this soft decoding can be implemented at a destination to mitigate complexity at a relay. This reduced complexity of soft decoding can be implemented with minimal hardware constraints at the relay, making the soft decoding more viable for a wide range of wireless communication devices.

System 200 can comprise a destination node 202 communicatively coupled with a relay node 204. Relay node 204 can be operative to forward a version of a source signal received by relay node 204, to destination node 202. In this manner, relay node 204 can facilitate spatial diversity communication for destination node 202, even where destination node 202 is a single-antenna device.

A signal received by relay node 204 is analyzed by an error component 208 to determine whether the received signal contains errors as a result of noise, channel fading, or like conditions of wireless channels. Error component 208 can embed an information flag 208A within a signal 206 transmitted to destination node 202, indicating a status of the received signal. In at least one aspect of the subject disclosure, information flag 208A can comprise a single bit of information, which can specify whether the relay node 204 received a signal with errors or without error. Additionally, relay node 204 can decode and re-encode and modulate relay data 210 (e.g., a received symbol $y_{SR}$), and transmit the relay data 210 with signal 206.

Destination node 202 receives signal 206 from relay node 204, as well as a source signal 212 transmitted by a source node (not depicted). A signal decoder 214 is employed by destination node to decode source data 212. In operation, signal decoder utilizes an analysis component 216 configured to determine whether source data 212 is received in error at relay node 204. For instance, analysis component 216 can read information flag 208A to determine whether source data 212 was received at relay node 204 in error. Furthermore, signal decoder 214 can employ a CRC code to determine whether source signal 212 is received in error at destination node 202. An error status pertaining at least to receipt of source data 212 at destination node 202 and receipt of source data 212 at relay node 204 is forwarded to a correction component 218. Correction component 218 can be configured to generate soft information from relay signal 206 to improve decoding of source data 212, in response to destination node 202 receiving source data 212 in error, and in response to at least relay node 204 receiving the source data 212 in error.

By generating soft information at destination node 202, system 200 can significantly reduce processing overhead at relay node 204 as compared with other soft forwarding techniques (e.g., techniques that require relay node 204 to generate the soft information). Moreover, system 200 can reduce bandwidth requirements of a relay-link channel between relay node 204 and destination node 202 compared to such soft forwarding techniques. As one example, by simply indicating via information flag 208A whether source data 212 is received at relay node 204 in error, a single bit of information is added to relay data 210. In this case, soft information is not transmitted over the relay-link channel in addition to relay data 210. In at least one embodiment, destination node 202 can comprise a logic component 220 configured to separate a first set of data from a second set of data from relay signal 206, the first set of data being transmitted for the destination node by the source node and received at the relay node and forwarded with relay signal 206. In this embodiment, analysis component 216 can be configured to read an information flag bit included in relay signal 206 pertaining to the first set of data and determine that the first set of data had been received without error at relay node 202. Moreover, according to this embodiment, correction component 218 can be configured to use the first set of data to generate soft decision information for decoding of a source signal (e.g., source data 212, . . . ). A protocol for generating soft information and employing the soft information to decode source data is described in more detail at FIG. 4, infra.

Figure 3A:
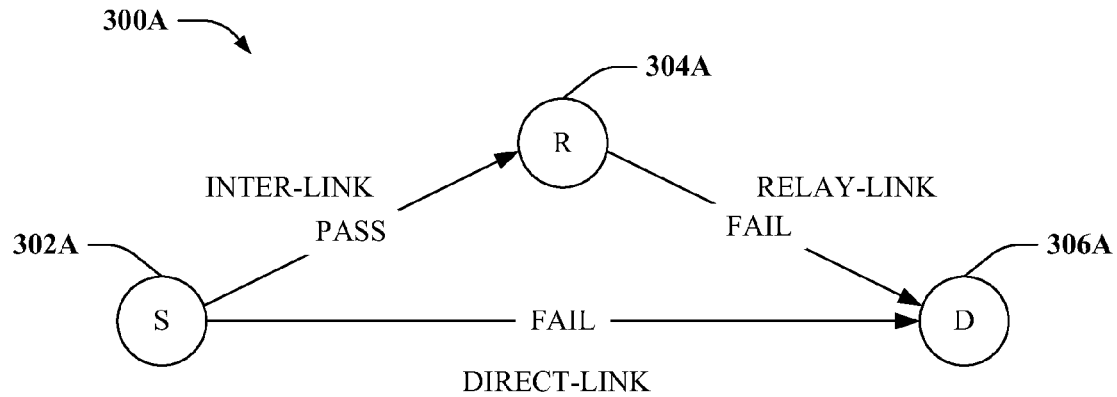
FIGS. 3A, 3B and 3C depict diagrams of example wireless transmission error scenarios for a single relay system pertinent to aspects of the subject disclosure.
Figure 3B:
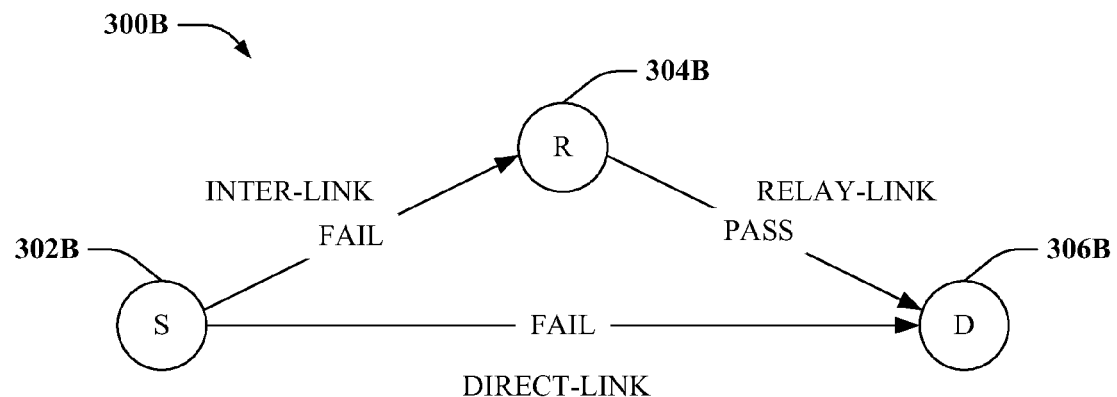
Figure 3C:
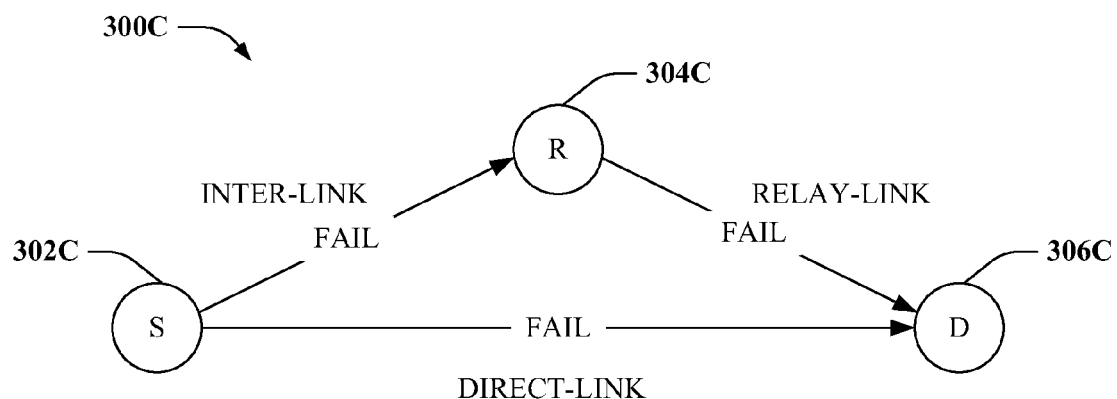

FIGS. 3A, 3B and 3C illustrate diagrams of example channel conditions for a single relay cooperative communication system according to further aspects of the subject disclosure. FIGS. 3A, 3B and 3C all depict a single relay cooperative wireless system, comprising a source node, relay node and destination node. The source node for the respective figures is indicated by reference number 302 followed by the associated figure letter (e.g., A for FIGS. 3A, B for FIGS. 3B, C for FIG. 3C). Likewise, the relay node is indicated by reference number 304A, 304B, 304C for the respective figures, and destination node indicated by 306A, 306B, 306C for the respective figures. Furthermore, three separate wireless channels com- municatively couple the respective nodes, an inter-link channel couples the respective source and relay nodes, a direct-link channel couples the respective source and destination nodes, while a relay-link channel couples the respective relay and destination nodes for each figure.

Referring first to FIG. 3A, a source signal transmitted by source node 302A over the direct-link channel is received with errors at destination node 306A, indicated by the label "FAIL" on the direct-link channel. Furthermore, a relay signal transmitted by relay node 304A over the relay-link channel is also received in error at destination node 306A, indicated by the similar "FAIL" label on the relay-link channel. However, the source signal is received without error at relay node 304A, indicated by the "PASS" label on the inter-link channel. Because relay node 304A accurately receives the source signal, it can forward an accurate copy of the source signal over the relay-link channel. Therefore, destination node 306A receives two copies of the source signal and can employ MRC code to decode the source signal, with the benefit of spatial diversity.

FIG. 3B depicts a channel condition in which the source-destination transmission is received with errors at destination node 306B, and in which the relay-destination transmission is received correctly at destination node 306B. If the relay-destination transmission were a re-transmission of an accurate version of the source-destination transmission, destination node 306B could simply decode the relay-destination transmission to obtain the bits transmitted by source node 302B. However, in this case the inter-link transmission fails, and thus destination node 306B cannot assume that the relay transmission is accurate. According to aspects of the subject disclosure, destination node 306B can, however, generate soft information from the relay transmission and employ the soft information to improve decoding of the source transmission.

For FIG. 3C, the direct-link transmission, inter-link transmission and relay-link transmission all fail (e.g., are received with errors). Similar to FIG. 3B, destination node 306C cannot assume that the relay transmission is an accurate version of the source transmission. However, in this case as well, destination node 306C can generate soft information from the relay-link transmission to improve decoding of the direct-link transmission. One particular aspect of the subject disclosure describes how the soft information is generated, and how it is utilized to decode the direct-link transmission, at FIG. 4.

Figure 4:
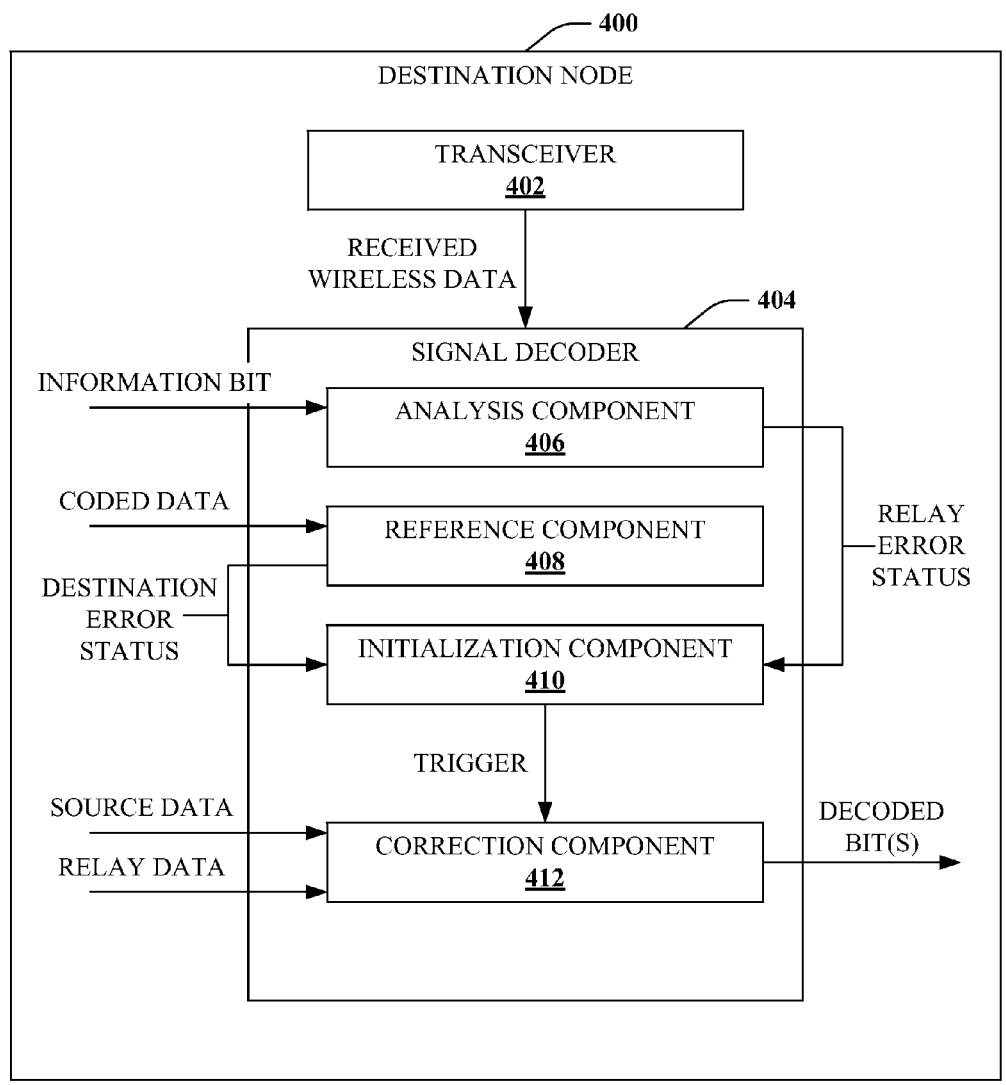
FIG. 4 illustrates a block diagram of an example destination node configured for soft-decision decoding in a wireless relay environment.

FIG. 4 illustrates a block diagram of an example destination node 400 according to aspects of the subject disclosure. It should be appreciated that destination node 400 can also serve as a source node in some aspects, transmitting data that is generated at destination node 400, for instance. In other aspects, destination node can also serve as a relay node for one or more other nodes (e.g., user nodes or network nodes—not depicted), re-transmitting received data. When serving as a relay node, destination node 400 can receive and re-transmit source signals, for instance as described above at FIG. 1, 2 or 3, supra, in addition to decoding symbols as described below.

Destination node 400 can comprise a transceiver 402 configured to transmit and to receive wireless signals. In one aspect of the subject disclosure, transceiver 400 comprises a single wireless antenna; however destination node 400 is not limited to this particular aspect. Wireless data received at transceiver 402 is provided to a signal decoder 404. This received wireless data can include, for instance, a received source signal (over a direct-link channel) as well as a received relay signal (over a relay-link channel). In various embodiments, signal decoder 404 can be configured to decode a source symbol of the source signal (e.g., received over a direct link) and to decode a relay symbol of the relay signal (e.g., received over a relay link), to facilitate identification of signal error or to facilitate correction of signal error, as described in more detail below.

An analysis component 406 can be configured to identify and read an information flag included with the relay signal wireless data to determine whether the relay signal is an accurate copy of the source signal (e.g., whether a relay node receives the source signal without error). Further to the above, coded data received from the source signal and the relay signal, respectively, can be provided to a reference component 408. Reference component 408 can be configured to execute a cyclic redundancy check to determine whether destination node 400 receives the source signal in error, and whether destination node receives the relay signal in error. Moreover, reference component 408 determines that the cyclic redundancy check fails for the source signal or the relay signal in response to detection of an error in a cyclic redundancy coding of the source signal or the relay signal, respectively. Reference component 408 then provides a destination error status to initialization component 410, indicating whether the source signal is received with error and whether the relay signal is received with error.

Initialization component 410 can be configured to trigger a correction component 412 to employ soft decision decoding to decode the source signal. Particularly, a trigger signal is sent to correction component 412 in response to destination node 400 receiving the source signal in error and the relay node receiving the source signal in error. According to at least one aspect of the subject disclosure, initialization component 410 can trigger correction component 412 to employ the soft decision regardless of how the relay signal is received at destination node 400. For instance, if the relay signal is received with errors or without errors, soft decision decoding can be triggered.

As described in more detail below, correction component 412 can generate soft decision information from coded relay data in conjunction with channel reliability data. In one specific aspect of the subject disclosure, the reliability data is derived solely from reliability of an inter-link channel (e.g., if the relay signal is received correctly at destination node 400), whereas in an alternative aspect the reliability data is derived from reliability of the inter-link channel and reliability of the relay-link channel (e.g., if the relay signal is received with error at destination node 400). However, according to a further aspect, reliability of the relay-link channel can be ignored, and in such case the reliability data is derived solely from the inter-link channel whether the relay signal is received with error at destination node 400 or received correctly.

According to particular aspects of the subject disclosure, correction component 412 can be configured to operate in one of various manners. In one instance, correction component 412 is pre-configured or hardwired to operate in one of the selected manners. In other instances, correction component 412 can be programmed to operate in one or another manner.

According to a first aspect, correction component 412 can be configured to operate in a soft decision mode. The soft decision mode can be implemented particularly for a poor inter-link channel. In other words, where a relay node fails to properly receive source signals, the soft decision mode can be employed by correction component 412.

In another aspect, correction component 412 can be configured to operate in a hard decision mode. The hard decision mode can be implemented particularly for a good inter-link channel. If the relay node successfully decodes the source signal, it can be assumed that the re-transmitted relay signal is a correct copy of the source signal. In this case, destination node 400 receives two versions of the source signal, even if one or both of those versions are received with errors at destination node 400. In this case, correction component 400 can employ MRC code (e.g., as described for signal decoder 118 of FIG. 1, supra) to combine information from the relay signal (e.g., $a_2 y_{RD}$) with hard information from the source signal (e.g., $a_1 y_{SD}$) and make a hard-decision to determine source bits values (e.g., a 0 or a 1 in the binary context) transmitted by the source signal and the relay signal.

In yet another aspect, correction component 412 can be configured to employ both soft decision decoding and hard decision decoding. In this aspect, the type of decoding can be selected based on the channel pass/failure states for a relay system (e.g., see relay systems 300A, 300B, 300C of FIGS. 3A-3C, supra). For instance, where a direct-link transmission fails and an inter-link transmission fails (e.g., relay systems 300B and 300C, respectively), correction component 412 can be triggered to employ soft decision information, since it cannot be assumed that two accurate versions of the source signal had been transmitted. On the other hand, where the direct-link transmission fails and the inter-link transmission succeeds (and the relay-link transmission fails), correction component 412 can be configured to employ the hard-decision MRC code, discussed above.

Returning to the first aspect based on soft decision information, correction component 412 can be configured to generate soft decision information from a sign function of the relay signal and a reliability function of the inter-link channel. The sign function can be generated by decoding a symbol(s) received on the relay signal, and re-encoding and modulating the symbol(s). The reliability function can be generated from an error probability function pertaining to a symbol(s) of the inter-link channel. Particularly, this error probability function can be based on channel state information of the inter-link channel (source to relay channel). As will be described in more detail below, depending on a desired level of complexity/non-complexity for destination node 400 and an associated relay node, the reliability function can be a bit-specific reliability function calculated for individual bits (most complex), a packet-specific reliability calculated as an average of all bits of a packet in which the symbol is transmitted (medium complexity), or a channel-specific reliability calculated as an average of all bits of packets received at the relay node in error, from the source node (least complex).

Referring now to the sign function of the soft decision information, a log-likelihood ratio (LLR) form of a posteriori probability of statistically independent transmissions in duel diversity formulated from multiple independent transmissions can be expressed as follows:

$$L(x|y_1, y_2, \ldots, y_n) = L_{c_1} y_1 + L_{c_2} y_2 + \ldots + L_{c_n} y_n + L(x) \quad (9)$$

where the channel value $L_{c_i} = 4h_i \bar{\gamma}_i$, and the a priori probability $L(x)=0$ where source information is chosen from zero and one with equal probability. Moreover, multiple symbols received at destination node 400 can be considered as multiple independent transmissions. However, since $y_{RD}$ is an estimation of $y_{SR}$, if $y_{SR}$ fails a CRC check, destination node 400 cannot make direct use of $y_{RD}$ and the inter-link SNR to construct the LLR values of relayed packets directly, and decode the received bits with equation (9).

To address this problem, correction component 412 generates soft information from CSI pertaining to the inter-link channel and hard-decision bits of $y_{RD}$. Correction component 412 inputs the soft information for the relay-link and hard-decision information for the direct-link to a Viterbi algorithm of the following form:

$$L(x_S|y_{SD}, y_{RD}) = 4 y_{SD} h_{SD} \bar{\gamma}_{SD} + \text{Sign}\{y_{RD}\} \cdot \text{Rel}\{y_{SR}\} \quad (10)$$

where $y_{SR}$ fails a CRC code check at a relay node. By dividing the LLR value for the relay signal into two parts, sign and reliability, where Sign $\{y_{RD}\}$ is defined as the modulated and coded hard-decision bits based on $y_{RD}$, and Rel$\{y_{SR}\}$ as the reliability value of $y_{SR}$. It should be appreciated that equation (10) is much simpler than decoding algorithms of other soft DF protocols, such as a maximum a posteriori (MAP) decoder, or the like.

In at least one aspect of the subject disclosure, the reliability function can be derived from the join error probability of the relay-link channel and the inter-link channel. This aspect can be employed, for instance, where transmissions on the direct-link, inter-link and relay-link all fail (e.g., system 300 of FIG. 3C). It should be appreciated that the protocol at the relay node is to forward re-encoded hard-decision bits $y_{RD}$ to the destination based on a received packet $y_{SR}$, independent of whether $y_{SR}$ passes or fails CRC at the relay node. An information flag bit is written to the relay signal indicating whether $y_{SR}$ is decoded successfully or unsuccessfully at the relay node. Although it can be inferred from failure of a CRC at destination node 400 that the packet $y_{RD}$ contains some error bits, $y_{RD}$ still can provide useful information to help decoding $y_{SD}$.

In order to calculate Rel$\{y_{SR}\}$ (or Rel$\{y_{SR}, y_{RD}\}$), CSI of the inter-link (or of the inter-link and the relay-link) can be transferred to destination node 400 on a pre-defined schedule. The rate at which CSI is transferred to destination node 400 is related to processing overhead and additional bandwidth required by a wireless relay system, and a desired bandwidth and processing overhead can be utilized to establish this rate. The CSI can be utilized to determine accuracy of reliability calculated by correction component 412, and improve system performance.

Referring again to the reliability function, Rel$\{y_{SR}\}$ is employed as a magnitude of soft information input into equation (10). The reliability value provides an estimate of accuracy of corresponding forwarded hard-decision bits (e.g., $y_{RD}$), weighting respective relayed bits when combined with the conditional probability of source signal bits (e.g., $4y_{SD}h_{SD}\bar{y}_{SD}$). A relationship between bit reliability and error probability is defined herein as follows:

$$Rel\{y(k)\} = \log\frac{1 - Pr(e(k))}{Pr(e(k))} \quad (11)$$

where Pr(e(k)) denotes error probability of a $k^{th}$ bit y(k). Correction component 412 therefore first determines the error probability of bits to ten derive associated reliability. For the bit error probability, assuming a block fading channel:

$$Pr\{e_j(k) | y_j(k), h_j, \gamma_j\} = \min_{s_i \in \{\pm 1\}} Pr(x_j(k) = s_i | y_j(k), h_j, \gamma_j) \quad (12)$$

$$= \min_{s_i \in \{\pm 1\}} \frac{Pr(y_j(k) | x_j(k) = s_i, h_j, \gamma_j) Pr(x_j(k) = s_i)}{Pr(y_j(k) | h_j, \gamma_j)}$$

$$= \frac{1}{1 + \exp[|4\mathcal{R}_*(y_j(k)h_j^*)\gamma_j|]}$$

where subscripts k and j denote the $k^{th}$ bit and $j^{th}$ packet, respectively. Further, $s_i$ represents the ith element of signal alphabet, having size M that is determined by an order of modulation scheme (e.g., M=2 for binary modulation).

The conditioned error probability of equation (12) is calculated by correction component 412. This alleviates processing overhead at a relay node transmitting the relay signal to destination node 400. Furthermore, the relay node can avoid having to forward the corresponding bit reliability of packets containing errors to destination node 400, mitigating increased bandwidth required for the relay signal. According to at least one disclosed aspect, the increased bandwidth can be limited to a single bit, for conveying an information flag denoting success or failure of the relay node in decoding $y_{SR}$. In other aspects, the relay node can transmit CSI for the inter-link node once or periodically, with a rate depending on whether correction component 412 is configured for bit-specific, packet-specific or channel-specific reliability.

Packet-specific reliability can be obtained from average reliabilities or error probabilities calculated over bits in a packet. Where reliability values are generated by averaging respective reliabilities of all bits of the packet, and where probability values are generated by averaging respective error probabilities of all the bits, distribution of error probability can generally be relatively flat compared to distribution of error reliability. Accordingly, error probabilities can be calculated first by correction component 412 and transformed into reliability values via equality (11). Thus:

$$Pr\{e_j(k) | h_j, \gamma_j\} = \quad (13)$$

$$\frac{1}{N}\sum_{k=1}^{N} Pr(e_j(k) | y_j(k), h_j, \gamma_j) = E[Pr(e_j(k) | y_j(k), h_j, \gamma_j)]$$

where N is the packet size. To implement the packet-specific reliability approach, the relay node informs destination node 400 of the reliability for each erroneous packet forwarded to destination node 400. For those erroneous packets, the packet-specific reliability can be quantized to a fixed number of bits and embedded into the packet, which occurs at low frequency as the packet error rate is quite low in general (leading to merely a moderate increase in relay-link bandwidth according to the packet-specific reliability approach). Further, simulation results suggest that end-to-end performance for a wireless relay system is not sensitive to minor variance of the reliability value (e.g., see Provisional patent application Ser. No. 61/418,811 entitled "NOVEL SOFT FORWARDING TECHNIQUE FOR COOPERATIVE COMMUNICATION," at page 29, and FIG. 3.10 at page 41).

Channel-specific reliability can be employed to reduce complexity and overhead at the relay node to a lowest level, compared with packet-specific reliability and bit-specific reliability. Channel-specific reliability can be obtained through averaging error probability over all bits of all erroneous packets. Thus:

$$Pr\{e_j(k) | \bar{\gamma}\} = \frac{1}{N_\varepsilon}\sum_{k=1}^{N_\varepsilon} Pr(e_j(k) | h_j, \bar{\gamma}) = E[Pr(e_j(k) | h_j, \bar{\gamma})] \quad (14)$$

where $N_\varepsilon$ represents the number of error packets. To provide a general solution to equation (14), Bayes rule can be employed to arrive at:

$$Pr\{e | \varepsilon, \bar{\gamma}\} = \frac{Pr(\varepsilon | e, \bar{\gamma}) Pr(e | \bar{\gamma})}{Pr(\varepsilon | \bar{\gamma})} \quad (15)$$

where e and ε denote a bit error event and a packet error event, respectively. For an uncoded system, (e.g., Pr(ε|e,γ̄)=1), equation (15) can be transformed to:

$$Pr\{e|\varepsilon,\overline{\gamma}\} = \frac{Pr(e|\overline{\gamma})}{Pr(\varepsilon|\overline{\gamma})} \quad (16)$$

$$= \frac{\frac{1}{2}\left(1-\sqrt{\frac{\overline{\gamma}}{1+\overline{\gamma}}}\right)}{\int_0^\infty \frac{1}{\gamma}\exp\left(-\frac{\gamma}{\overline{\gamma}}\right)[1-(1-Q(\sqrt{2\gamma}))^N]d\gamma}$$

Equation (16) is valid for an uncoded system. For a coded system, corresponding bit error rate and packet error rate can be obtained by table lookup (stored e.g., in a database—not depicted—at destination node 400), or other suitable mechanism. Moreover, Pr(ε|e,γ̄) is not equal to 1 in a coded system, but a rational number in a range of (0, 1). The smaller the rational number is, the stronger the code correction capability of the coded system. Thus, with knowledge of a code book and inter-link CSI (or, e.g., inter-link and relay-link CSI), correction component 412 can estimate channel-specific erroneous bit reliability without help from the relay node. For correction component 412 to calculate channel-specific reliability, the relay node need only include the one-bit hard decision information in a relay signal forwarded to destination node 400. For the system in which correction component 412 does employ the channel-specific reliability for Rel{$y_{SR}$} (or Rel{$y_{SR}$, $y_{RD}$}), the soft decoding of the subject disclosure, represented by equation (10), is referred to as a one-bit soft decoding protocol.

It should be appreciated that as packet size increases, accuracy of the reliability function increases. This is a result of higher packet error rates for longer packet lengths, where error bits occupy a smaller proportion of the bits within an erroneous packet. Thus, average reliability of any one bit in the erroneous packet becomes higher.

By substituting equation (12), (13) or (16) into equation (11), the corresponding bit-specific, packet-specific, or channel-specific reliability can be obtained and utilized for Rel{$y_{SR}$} in equation (10). It is assumed that destination node 400 acquires accurate knowledge of inter-link (or, e.g., inter-link and relay-link) channel CSI from the relay node. If channel-specific reliability is employed, little overhead exists (other than an information flag bit) since correction component 412 can calculate reliability based on knowledge of the code book and average inter-link channel SNR (or inter-link and relay-link channel SNR). If packet-specific reliability is employed, CSI is transmitted by the relay node to destination node 400 with each transmitted packet. If bit-specific reliability is employed, the relay node transmits CSI (e.g., inter-link fading coefficients) for each bit duration.

Among these reliability approaches, channel-specific reliability has the lowest end-to-end error performance, but it requires the least overhead for a wireless relay system (e.g., the least frequent update of CSI from a relay node to destination node 400). In this case, average inter-link channel SNR can be provided to destination node 400 during an initialization period for a wireless relay system. For channel-specific reliability, average inter-link channel SNR need not be updated thereafter (or, e.g., at least not until the network is re-initialized). For a wireless relay network having limited bandwidth or processing capability, channel-specific reliability can provide a greater benefit. For relay networks having greater processing capability or greater network resources, packet-specific reliability or bit-specific reliability may be selected instead.

Figure 5:
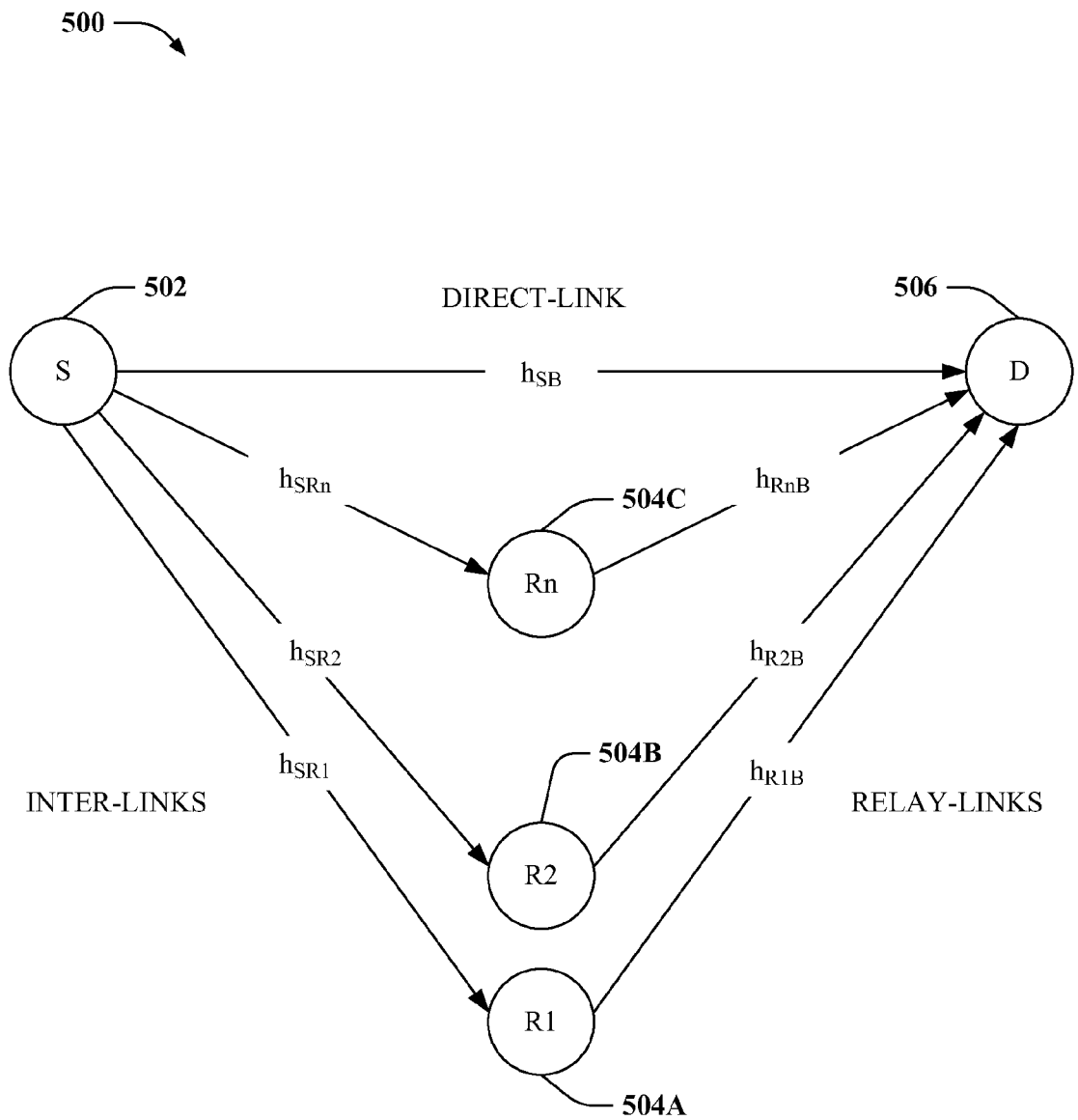
FIG. 5 depicts a diagram of an example multiple-relay cooperative communication environment in which soft-decision decoding can be employed.

FIG. 5 illustrates a block diagram of an example multi-relay wireless system 500 (system 500) according to further aspects of the subject disclosure. System 500 can comprise a source node 502 and a destination node 506, and a plurality of relay nodes, including relay node$_1$ 504A, relay node$_2$ 504B, ..., relay node$_n$ 504C (referred to collectively as relay nodes 504A-504C), where n is a positive integer greater than one. As depicted, a direct-link channel $h_{SB}$ communicatively couples source node 502 and destination node 506. A set of inter-link channels $h_{SR1}$, $h_{SR2}$, ..., $h_{SRn}$ (referred to collectively as inter-link channels $h_{SR1}$-$h_{SRn}$) facilitate communication between source node 502 and respective relay nodes 504A-504C, and a set of relay-link channels $h_{R1B}$, $h_{R2B}$, ..., $h_{RnB}$ (referred to collectively as relay-link channels $h_{R1B}$-$h_{RnB}$) facilitate communication between the respective relay nodes 504A-504C and destination node 506.

In operation, relay nodes 504A-504C receive broadcast signals from source node 502, and one or more of the relay nodes can forward the broadcast signals to destination node 506. Destination node 506 can then decode the received signals in similar fashion as described with respect to FIG. 4, and the error examples of FIGS. 3A-3C. For instance, if direct-link and relay-link transmissions fail respective CRCs at destination node 506, but one of the inter-link transmissions succeed (e.g., a relay node accurately decodes a signal from source node 502, an example of which is depicted by system 300A, described supra), destination node 506 can employ an MRC algorithm to combine the successful inter-link transmission with the direct-link transmission. If the direct-link transmission and relay-link transmissions fail the CRC, destination node 506 can instead employ soft decision coding instead (e.g., based on equation (10)). Since a transmission failure at each relay is independent of success or failure at other relays, the probability that at least one of the $N_R$ relay branches are described by FIG. 3B or 3C (e.g., both the direct-link and inter-link transmissions fail) in a $N_R$ relay network is given by:

$$\sum_{k=1}^{N_R} \binom{N_R}{k} Pr_{case_1}^{N_R-k}(1-Pr_{case_1})^k \quad (17)$$

where the number of relays is $N_R$, and the error case probability $Pr_{case_1}$ represented by the error occurrences illustrated in system 300A of FIG. 3A is given by:

$$Pr_{case_1}=Pr(\epsilon_{SD}|\overline{\gamma}_{SD}) \times Pr(\epsilon_{RD}|\overline{\gamma}_{RD}) \times (1-Pr(\epsilon_{SR}|\overline{\gamma}_{SR})).$$

Moreover, the probabilities of error case 2 (system 300B) and error case 3 (system 300C) are given by:

$$Pr_{case_2}=Pr(\epsilon_{SD}|\overline{\gamma}_{SD}) \times (1-Pr(\epsilon_{RD}|\overline{\gamma}_{RD})) \times Pr(\epsilon_{SR}|\overline{\gamma}_{SR}),$$
and $$Pr_{case_3}=Pr(\epsilon_{SD}|\overline{\gamma}_{SD}) \times Pr(\epsilon_{RD}|\overline{\gamma}_{RD})) \times Pr(\epsilon_{SR}|\overline{\gamma}_{SR}),$$
respectively.

By increasing the number of relays in a wireless system, a larger gain is achieved from the soft decoding protocol of the subject disclosure, as compared with conventional soft DF protocols. The associated complexity of the soft decoding protocol can still be significantly lower than for the soft DF protocols as well (e.g., when the soft decoding protocol is based on channel-specific reliability). Thus, even for the multi-relay network of system 500, the soft decision protocol provides significant advantages over conventional techniques.

Figure 6:
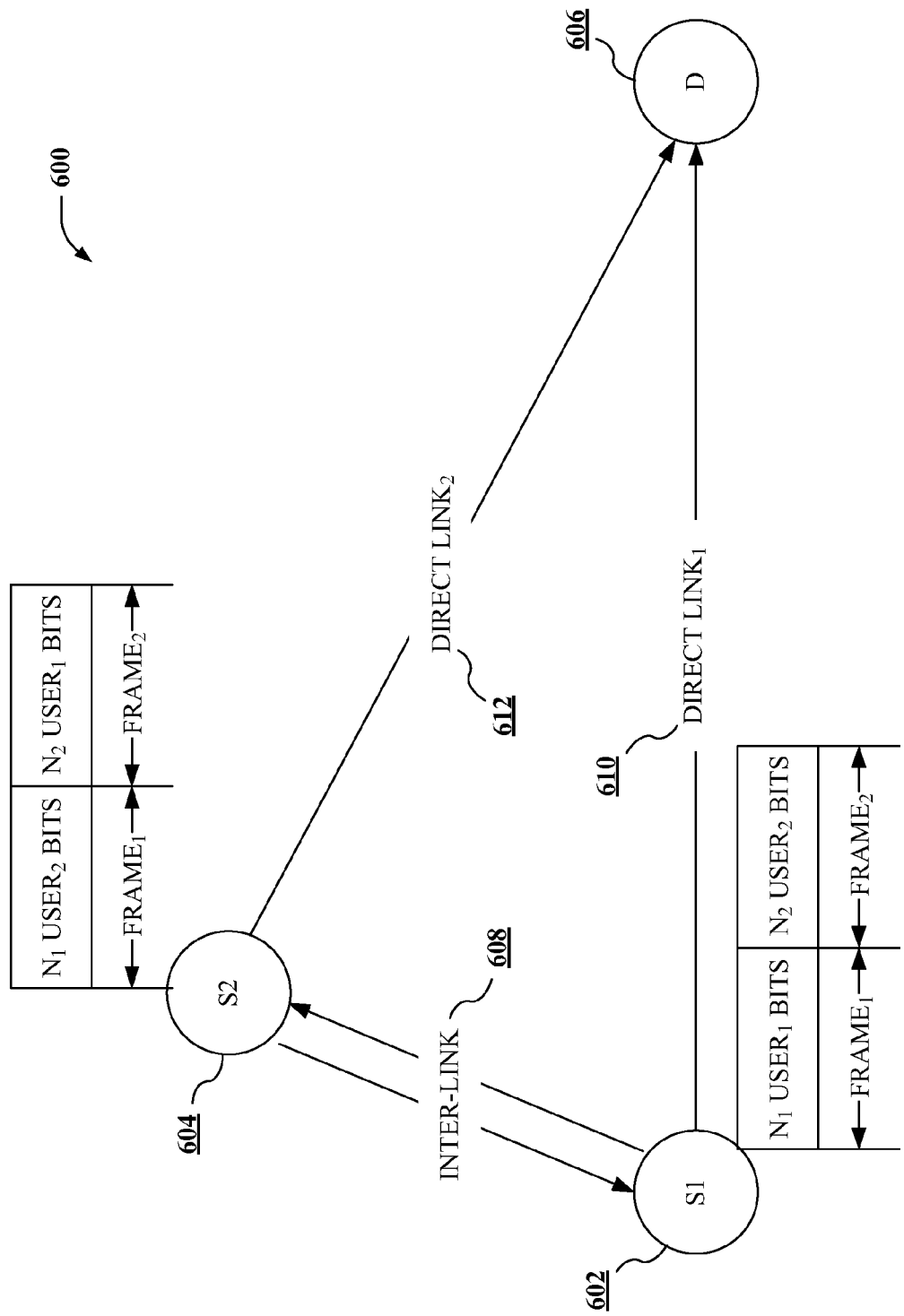
FIG. 6 illustrates a diagram of a sample cooperative coding relay system for which soft-decision decoding according to disclosed aspects can be employed.

FIG. 6 illustrates a block diagram of an example wireless relay system 600 (system 600) according to one or more additional aspects of the subject disclosure. System 600 can be a network relay configured for coded cooperation, having a first user node 602, a second user node 604, and a destination node 606. As depicted, an inter-link channel 608 communicatively couples first user node 602 and second user node 604, whereas respective direct-link channels, direct-link$_1$ 610 and direct-link$_2$ 612 communicatively couple first user node 602 and second user node 604, respectively, with destination node 606. Moreover, the coded cooperation of system 600 can be integrated with soft decoding as described herein, to further improve end-to-end system performance.

Coded cooperation utilizes joint routing and channel coding in cooperation. Transmissions in the coded cooperation scheme of system 600 employ binary phase-shift keying (BPSK) modulation, where each user node transmits with the same power. Inter-link 608, direct-link$_1$ 610 and direct-link$_2$ 612 are mutually independent with flat Rayleigh fading and zero-mean AWGN, and are reciprocal, such that respective nodes sharing a channel experience the same fading coefficient. Further, each node comprises or obtains suitable CSI required to implement coherent detection.

In operation, coded cooperation involves first user node 602 and second user node 604 encoding a block of K source bits using CRC code concatenated with a channel coding, having an overall code rate of R. Thus, a total of N=K/R coded bits are generated per block. The respective user nodes cooperate by dividing the transmission of their respective N-bit blocks into two frames. In a first frame of length $N_1$, each user node transmits with a code rate of $R_1=K/N_1$, which can be viewed as a subset of the total N bits comprising all information bits. After transmitting respective source bits in frame$_1$, the respective user nodes (along with destination node 606) receive the respective transmissions of the other user node, and decodes the transmission. Thus, first user node 602 receives and decodes the frame$_1$ transmission of second user node 604, and vice versa. If a user node successfully receives and decodes the frame$_1$ transmission of the other corresponding user node, the user node computes and transmits remaining $N_2$ bits for the other corresponding user node in frame$_2$. Thus, system 600 depicts the scenario where both first user node 602 and second user node 604 correctly receive and decode the frame$_1$ transmission of the opposite user node, and therefore in frame$_2$ first user node 602 transmits the $N_2$ bits for second user node 604, and second user node 604 transmits the $N_2$ bits for first user node 602.

If a user node fails to correctly decode the frame$_1$ transmission of the other corresponding node, the user node transmits its own $N_2$ bits in frame$_2$. The additional $N_2$ bits are selected so that they can be combined with the respective $N_1$ bits to produce a strong rate of R codeword. Whether the first user node and second user node receive the other corresponding node's frame$_1$ transmission successfully or not, each user node transmits $N=N_1+N_2$ bits in frame$_1$ and frame$_2$. The ratio of $N_2/N$ is defined as the cooperation level for system 600.

Generally speaking, various error correction codes can be used for the coded cooperation framework of system 600. As an illustrative example, a rate compatible with a punctured convolutional code family with memory M=4, and puncturing period P=8 (e.g., see J. Hagenauer, "Rate-compatible punctured convolutional codes (rcpc codes) and their applications," *IEEE Transactions on Communications*, vol. 36, no. 4, pp. 389-400, 1988, incorporated herein by reference). A mother code for this error correction code can be (23, 35, 27, 33)$_S$ with R=¼, and a first frame codeword can be obtained by applying the puncturing matrix corresponding to $R_1$=½. Additional parity bits for frame$_2$ are those punctured in frame$_1$.

First user node 602 and second user node 604 operate independently in frame$_2$, and thus are not aware of success or failure of the other corresponding user node in decoding the frame$_1$ transmission. Thus, four possible error cases can occur for the coded cooperation of system 600. For case 1, both user nodes successfully decode the frame$_1$ transmission of the other corresponding user node, and both send additional parity bits for the other corresponding user node in frame$_2$. Case 1 is the error case depicted by system 600. For case 2, neither user node successfully decodes the frame$_1$ transmission of the other corresponding node. In this case, system 600 reverts to non-cooperative mode for frame$_2$, and each user node transmits its own $N_2$ bits. Cases 3 and 4 are symmetrical in that only one user node successfully decodes the frame$_1$ transmission of the other corresponding user node (e.g., case 3 can include the case where first user node 602 successfully decodes the frame$_1$ transmission of the second user node 604 and the second user node 604 fails to decode the frame$_1$ transmission of the first user node 602; whereas case 4 can include the case where second user node 604 successfully decodes the frame$_1$ transmission of the first user node 602 and the first user node 602 fails to decode the frame$_2$ transmission of the second user node 604, as one example). In cases 3 and 4 then, neither user node transmits its own $N_2$ bits, and instead both user nodes transmit the $N_2$ bits for the other corresponding user node.

If the destination node 606 does not know which cooperative case occurs in frame$_2$, destination node 606 can, for example, decode the frame$_2$ transmissions according to four different assumptions until a CRC check succeeds for the respective frame$_2$ transmissions. Thus, for instance, destination node 606 can decode received frame$_2$ transmissions according first to case 1, then case 2, case 3, and case 4, until successful. In at least one aspect of the subject disclosure, however, first user node 602 and second user node 604 can transmit a one-bit information flag identifying whether the frame$_1$ transmission was successfully decoded. According to this aspect, destination node 606 can distinguish among the four cooperative cases for each pair of frames.

According to various aspects of the subject disclosure, soft decoding can be implemented in conjunction with the cooperative coding protocol described above for system 600. In at least one aspect, the one-bit soft decoding protocol can be employed, based on channel-specific reliability described at FIG. 4, supra (although the subject disclosure is not limited to this aspect). Among the four frame$_1$ and frame$_2$ transmission cases described above, only case 1 achieves a full diversity order for both user nodes (e.g., where both inter-link transmissions of frame$_1$ are successfully decoded and thus both user nodes transmit the $N_2$ bits of the other corresponding node in frame$_2$).

In a particular aspect of the subject disclosure, the soft decoding protocol as applied to the coded cooperation of system 600 requires each user node to compute and transmit the additional parity bits for the other corresponding user node in frame$_2$, regardless of the success or failure of decoding the respective frame$_1$ transmissions. By requiring each user node to transmit the other corresponding user node's bits in frame$_2$, cooperative mode is ensured, and frame$_1$ and frame$_2$ transmissions occur per case 1, as depicted by system 600, regardless of success or failure of decoding of frame$_1$ transmissions. Under this requirement, a total of $N=N_1+N_2$ bits are received at destination node 606 through direct-link$_1$ 610 and direct-link$_2$ for each user node. If a user node successfully decodes the other corresponding user node's data in frame$_1$ (e.g., successfully decodes the signal $y_{SR}$, as defined herein), destination node 606 then combines the two received codewords together to form a R=K/N codeword, where each bit is weighted according to an associated fading coefficient and received SNR, similar to the MRC code described herein.

If, on the other hand, a user node fails to decode a frame$_1$ transmission of the other corresponding user node (e.g., $y_{SR}$ is not successfully decoded at the user node), forwarded information (e.g., $x_{RD}$) is assumed to contain errors. In this case, destination node 606 can combine the two received codewords to form a rate of R$_1$ codeword, where the forwarded bits are decoded and regenerated using a frame 1 code book, for example. More particularly, each bit can be weighted by a reliability value with a sign determined by the decoding of the received forwarded bit (e.g., $y_{RD}$). This differs from the conventional coded cooperation protocol since the derived reliability values are based on LLR combining.

Figure 7:
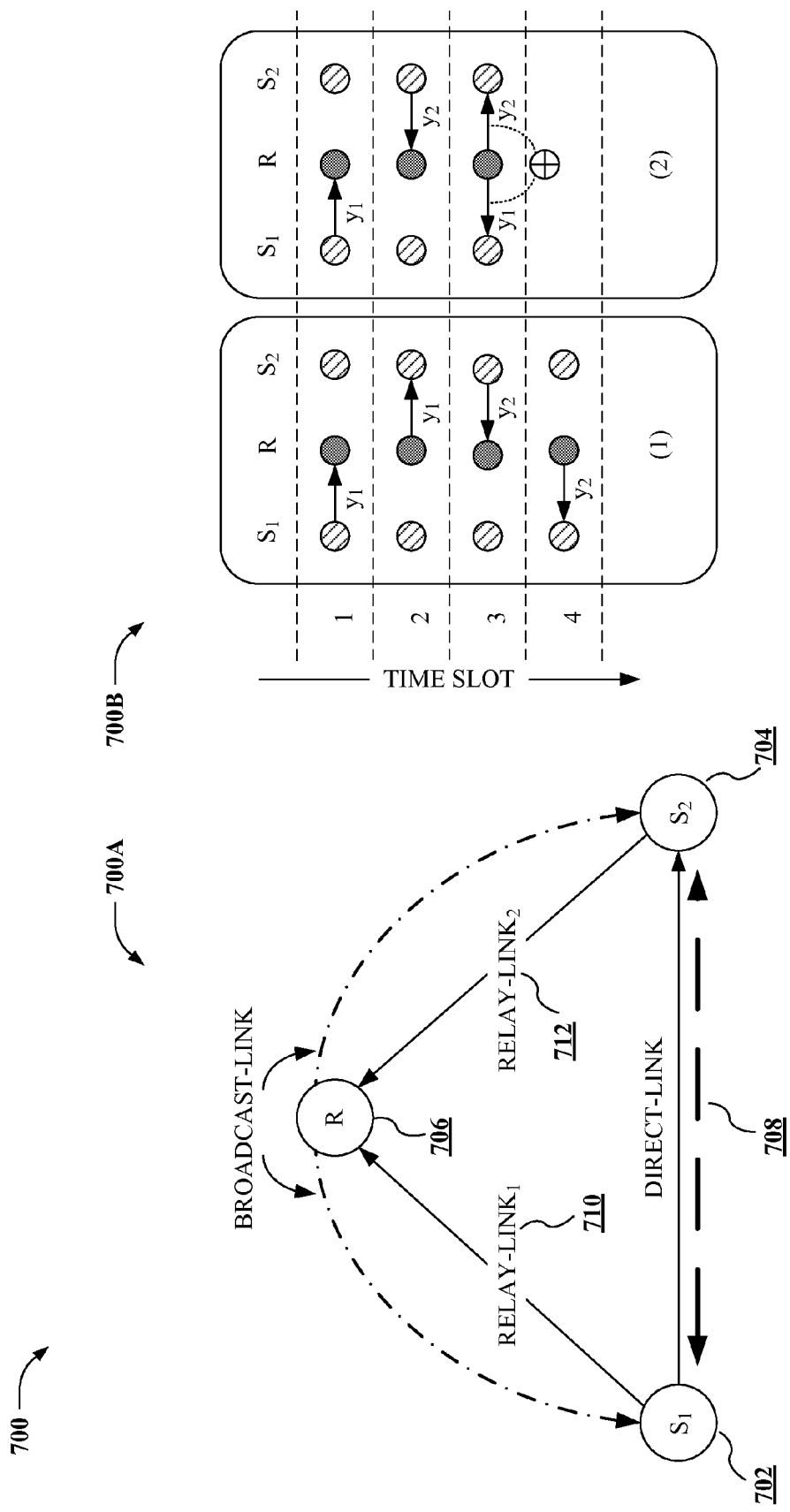
FIG. 7 depicts a diagram of an example network coding system with which soft-decision decoding can be employed according to still other aspects.

FIG. 7 illustrates a block diagram of an example wireless relay system 700A (system 700A) and an associated comparative diagram 700B of transmissions for system 700A. For system 700A, two user nodes S$_1$ 702 and S$_2$ 704 are engaged in a peer-to-peer link over a direct-link channel 708. A relay node 706 is dedicated to both user nodes and facilitates diversity by re-transmitting respective transmissions of the respective user nodes. The link between user node S$_1$ and the relay node is relay-link$_1$ 710, whereas the link between user node S$_2$ and the relay node is relay-link$_2$ 712.

This three node model of system 700 has a problem of collision at relay node 706 if both user nodes transmit information to each other concurrently. Two types of relaying schemes are depicted by comparative diagram 700B. Scheme (1) (left side of comparative diagram 700B) is based on a conventional DF protocol, whereas scheme (2) (right side of comparative diagram 700B) is based on a network coding protocol. For the conventional DF protocol, relay node 706 receives and forwards transmissions for the two user nodes all in separate time slots. For instance, a transmission is received from S$_1$ 702 in time slot one, which is forwarded to S$_2$ in time slot two. Likewise, a transmission is received from S$_2$ in time slot three, which is forwarded to S$_1$ in time slot four. For the network coding protocol of scheme (2), respective transmissions of S$_1$ 702 and S$_2$ 704 are received in time slot one and time slot two, respectively. An exclusive OR (XOR) operation is employed in time slot three to combine and broadcast both transmissions in time slot three. The network coding protocol therefore reduces transmit time to receive and re-transmit two signals by ¼ compared with the conventional DF protocol, yielding an increase to maximum throughput for system 700A.

Generally, network coding is assumed to operate free of decoding errors. However, this is often not realistic for actual systems. Where error transmission is considered for system 700A, four error possibilities exist, similar to the error cases described for FIG. 6, supra. Particularly, relay node receives and decodes respective signals from both S$_1$ 702 and S$_2$ 704 correctly (case 1), receives and decodes neither signal correctly (case 2), or receives and decodes one or the other signal correctly (cases 3 and 4, respectively). The XOR operation is problematic when decoding errors exist; in this case the soft decoding protocols described herein can be implemented in conjunction with the network coding model of system 700A and comparative diagram 700B scheme (2).

To implement the soft decoding for the network coding protocol (also referred to as soft network decoding), relay node 706 receives respective source signals from S$_1$ 702 and S$_2$ 704 and performs a CRC on the respective receive signals. A bit-level XOR operation is performed on information bits of the respective signals, combining the respective information bits into a single set of bits, whether received correctly or in error, and a combined transmission (e.g., a result of the XOR operation) is broadcast by relay node 706. Accordingly, two versions of each signal are transmitted regardless of error status at relay node 706, a first version transmitted by each of the respective user nodes, and a second version within the broadcast. In a particular aspect of the subject disclosure, relay node 706 can further indicate a status of the respective CRC checks within the broadcast (e.g., utilizing one information flag bit each for the respective statuses).

Upon receiving the broadcast, the respective user nodes can first perform a XOR operation to extract the other corresponding user node's source signal bits, at a codeword level. The user nodes reference the appropriate information flag bit to determine whether the extracted signal bits were received properly at relay node 706. If the bits were received properly, an MRC code is employed to decode the extracted bits and the direct-link source signal. Otherwise, one-bit soft decoding can be employed (e.g., according to equation (10)), where a direct-link bit is weighted by a channel fading coefficient and average SNR, and a corresponding extracted relay bit re-coded and modulated for a sign of soft information (e.g., Sign$\{y_{RD}\}$), and reliability information (e.g., Rel$\{y_{SR}\}$) of the corresponding relay channel employed to weight the sign, as described herein.

As mentioned above, four possible error cases exist, but with different consequences due to the XOR operation employed by relay node 706 (and by the respective user nodes to extract target information bits). For error case 1, both source signals are received successfully at relay node 706, and the XOR operation can be performed properly. For cases 3 and 4, only one of the respective source signals is decoded properly at relay node 706, but this can affect extraction of information bits utilizing the XOR operation at the corresponding user nodes. For instance, if the source signal transmitted by S$_1$ 702 is correctly received, S$_1$ can utilize its own source signal to accurately extract the source signal bits of S$_2$ correctly; the latter assumed to be at least in part corrupt because of the CRC failure at relay node 706 for the S$_2$ source signal. However, S$_2$ cannot utilize its own source signal to extract the S$_1$ bits since the broadcast signal is not accurate with respect to S$_2$.

For the case where source signal of S$_2$ is decoded with error at relay node 706, packets extracted at the respective user nodes after the second XOR operation can be represented as follows:

$$y_1 \oplus \hat{y}_2 \oplus y_1 = y_2 \oplus e_a \qquad (18)$$

$$y_1 \oplus \hat{y}_2 \oplus y_2 = y_1 \oplus e_a \qquad (19)$$

where $\oplus$ denotes the XOR operation, $y_1$ and $y_2$ represent received packets for S$_1$ 702 and S$_2$ 704, respectively, $\hat{y}_2$ denotes a corrupted packet of S$_2$ 704, and $e_a$ denotes an error in a binary symmetric channel, with Pr($e_a$)=p the BER for a certain link channel. Source node S$_1$ 702 can extract the S$_2$ source signal bits (with errors), since the XOR operation involves a correct copy of the source signal bits of user node S$_1$ 702. Since the broadcast signal contains error bits $\hat{y}_2$ from the source signal of user node S$_2$ 704, S$_2$ may not necessarily use its source signal bits to successfully recover the source signal bits of S$_1$ from the broadcast signal. For the case where source signal of S$_1$ is decoded with error at relay node 706, a similar situation occurs for user node S$_1$.

For the final case in which both source signals are decoded incorrectly at relay node 706, the XOR operation at relay node 706 yields the following:

$$\hat{y}_1 \oplus \hat{y}_2 \oplus y_1 = y_2 \oplus e_b \qquad (20)$$

$$\hat{y}_1 \oplus \hat{y}_2 \oplus y_2 = y_1 \oplus e_a \qquad (21)$$

where $e_b$ indicates an error in binary symmetric channel with $Pr(e_b) = 2p(1-p)$, assuming both relay-link$_1$ 710 and relay-link$_2$ 712 have the same mean SNR with BER=p. Generally, $Pr(e_b)$ approximates to 2p. Therefore, corresponding reliability values, as defined herein, can be applied for these signals for appropriate weighting of soft information. Additionally, where the probability of both signals being received with error is low, the same reliability value can be utilized for any of the error cases with minimal change in end-to-end performance (e.g., where source signal of $S_1$ 702 is received in error, source signal of $S_2$ is received in error, or where both source signals are received in error).

The aforementioned systems have been described with respect to interaction between several components and/or wireless communication entities. It should be appreciated that such systems and components can include those components or sub-components specified therein, some of the specified components or sub-components, and/or additional components. For example, a system could include source node 102, relay node 104, and destination node 106 including signal decoder 404, or a different combination of these or other entities. Sub-components could also be implemented as modules communicatively coupled to other modules rather than included within parent modules. Additionally, it should be noted that one or more components could be combined into a single component providing aggregate functionality. For instance, reference component 408 can include analysis component 406, or vice versa, to facilitate determining an error status at a source signal at a relay node and determining error status of the source signal at a destination node, by way of a single component. The components can also interact with one or more other components not specifically described herein but known by those of skill in the art.

Figure 8:
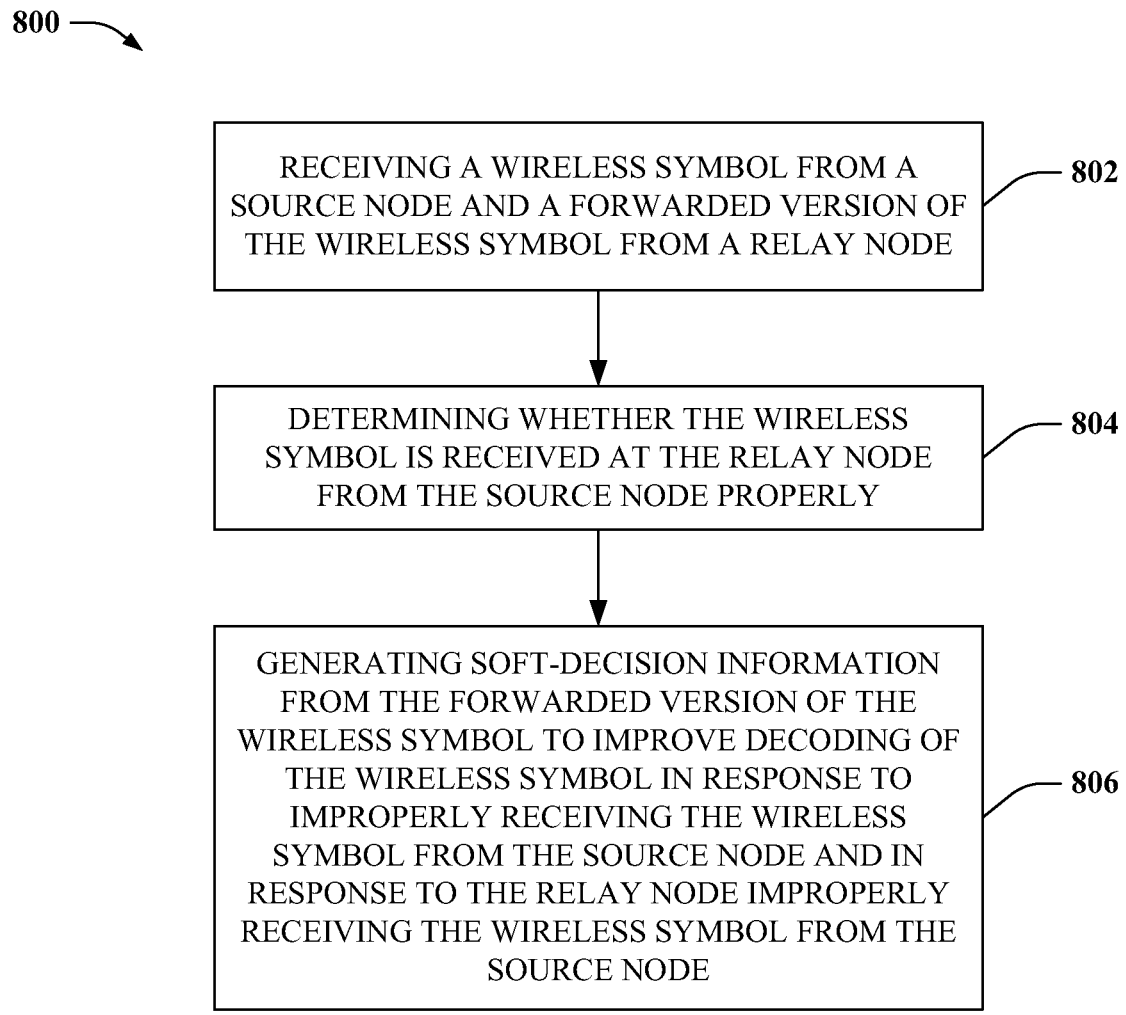
FIG. 8 depicts a flowchart of a sample method for soft-decision decoding in wireless relay communications according to further aspects.
Figure 9:
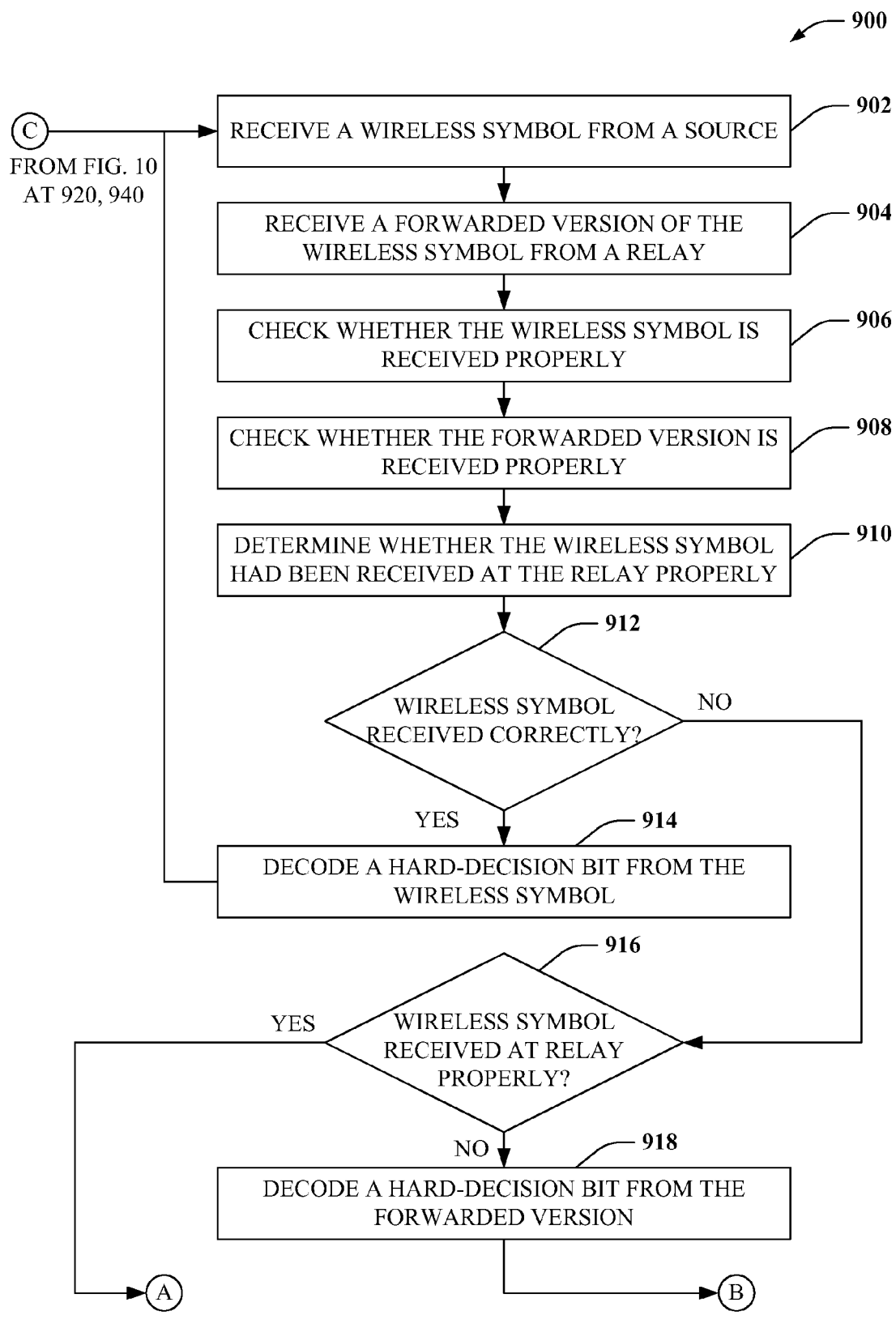
FIGS. 9 and 10 illustrate a flowchart of an example method for implementing soft-decision decoding to improve performance in a wireless relay system.
Figure 10:
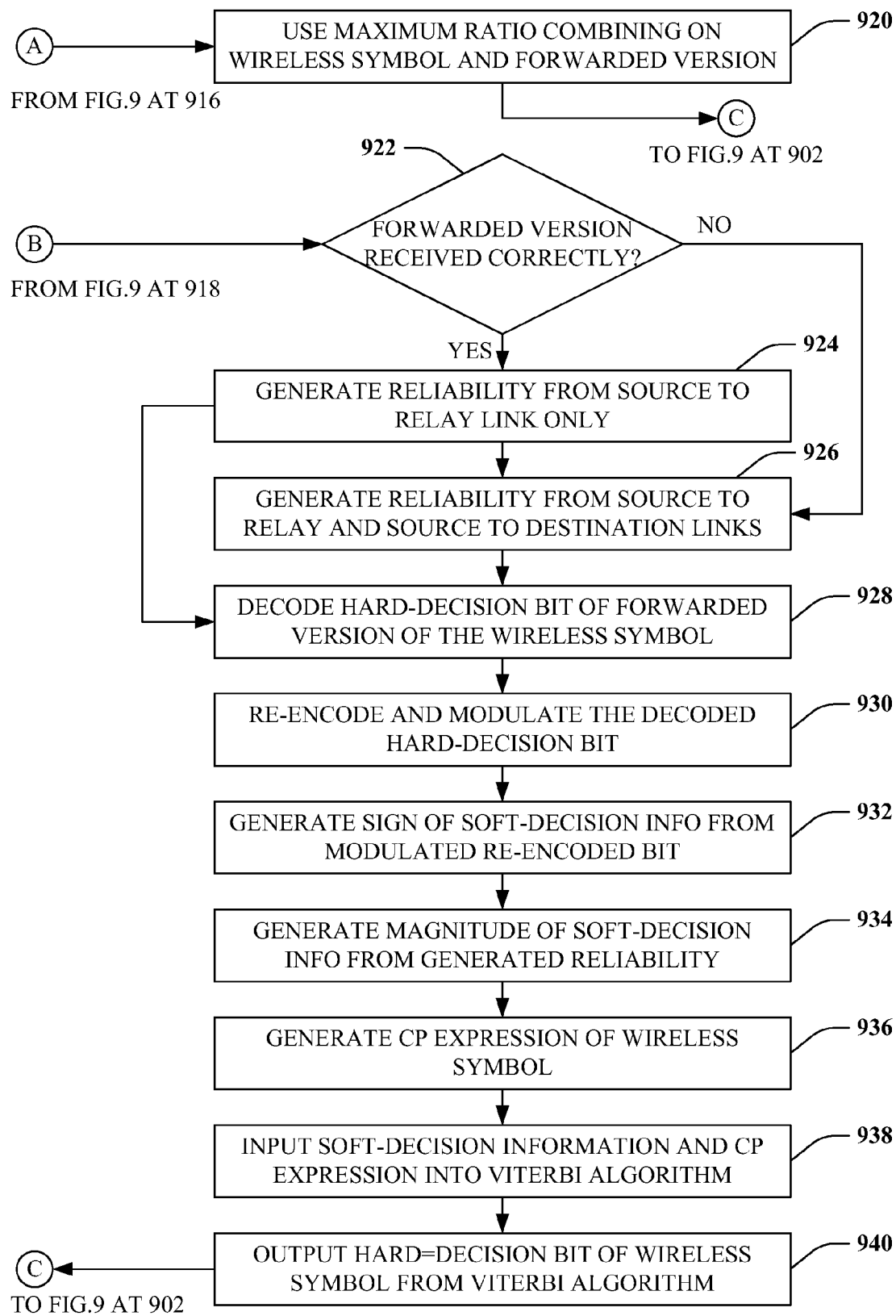

FIGS. 8, 9, and 10 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

FIG. 8 illustrates a flowchart of a sample method 800 according to additional aspects of the subject disclosure. At 802, method 800 can comprise receiving a wireless symbol from a source node and a forwarded version of the wireless symbol from a relay node. At 804, method 800 can comprise determining whether the wireless symbol is received at the relay node from the source node properly. In at least one aspect, the determining can be based on referencing an information flag transmitted by the relay node with the forwarded symbol. At 806, method 800 can comprise generating soft-decision information from the forwarded version of the wireless symbol to improve decoding of the wireless symbol, in response to improperly receiving the wireless symbol from the source node and in response to the relay node improperly receiving the wireless symbol from the source node.

FIGS. 9 and 10 depict a flowchart of an example method 900 according to still further aspects of the subject disclosure. At 902, method 900 can comprise receiving a wireless symbol from a source node. At 904, method 900 can comprise receiving a forwarded version of the wireless symbol from a relay node. At 906, method 900 can comprise checking whether the wireless symbol is received properly, and at 908 method 900 can comprise checking whether the forwarded version is received properly.

At 910, method 900 can comprise determining whether the wireless symbol had been received at the relay node properly. At 912, method 900 proceeds to 914 if the wireless symbol had been received properly; otherwise method 900 proceeds to 916. At 914, method 900 can comprise decoding a hard-decision bit from the wireless symbol, and returning to reference number 902.

At 916, method 900 can comprise determining whether the wireless symbol had been received properly at the relay. If the wireless symbol is received properly at the relay, method 900 proceeds to FIG. 10 at 920. If the wireless symbol is received with errors at the relay node, method 900 proceeds to 918, and decodes a hard-decision bit from the forwarded version. Method 900 then proceeds to FIG. 10 at 922.

Referring now to FIG. 10, at 920 method 900 can comprise using maximum ratio combining on the wireless symbol and the forwarded version to decode the wireless symbol. Method 900 can then return to reference number 902. At 922, method 900 can determine whether the forwarded version was received correctly. If so, method 900 can proceed to 924; otherwise method 900 proceeds to 924.

At 924, method 900 can comprise generating reliability information from a source to relay link. Method 900 then proceeds to 928. At 926, method 900 can comprise generating reliability information from a source to relay link and a relay to destination link, and proceed to reference number 928.

At 928, method 900 can comprise decoding a hard-decision bit of the forwarded version of the wireless symbol. At 930, method 900 can comprise re-encoding and modulating the decoded hard-decision bit. At 932, method 900 can comprise generating a sign of soft-decision information from the modulated, re-encoded hard-decision bit. At 934, method 900 can comprise generating a magnitude of soft-decision information from the generated reliability information. At 936, method 900 can comprise generating a conditional probability expression (a CP expression) from the received wireless symbol. At 938, method 900 can comprise inputting the soft-decision information and the CP expression into a Viterbi algorithm. At 940, method 900 can comprise outputting a hard-decision bit of the wireless symbol from the Viterbi algorithm. From 940, method 900 can return to reference number 902.

Figure 11:
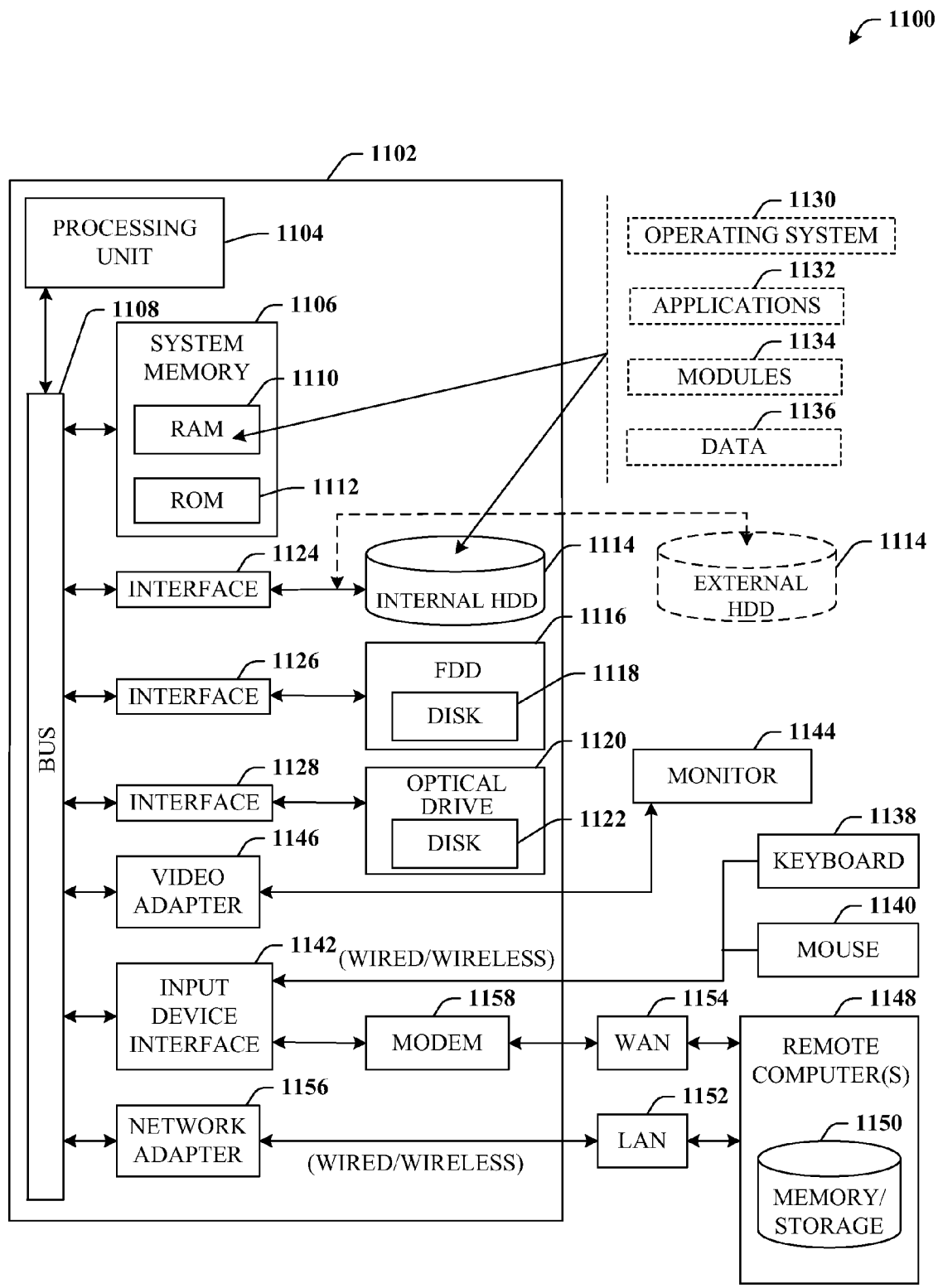
FIG. 11 illustrates a block diagram of an example electronic processing device operable to execute one or more aspects of the disclosed systems or methods.

Referring now to FIG. 11, there is illustrated a block diagram of an exemplary computer system operable to execute aspects of the disclosed subject matter. In order to provide additional context for various aspects of the various embodiments, FIG. 11 and the following discussion are intended to provide a brief, general description of a suitable computing environment 1100 in which the various aspects of the various embodiments can be implemented. Additionally, while the various embodiments described above may be suitable for application in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 11, the exemplary environment 1100 for implementing various aspects of one or more of the various embodiments includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the various embodiments.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
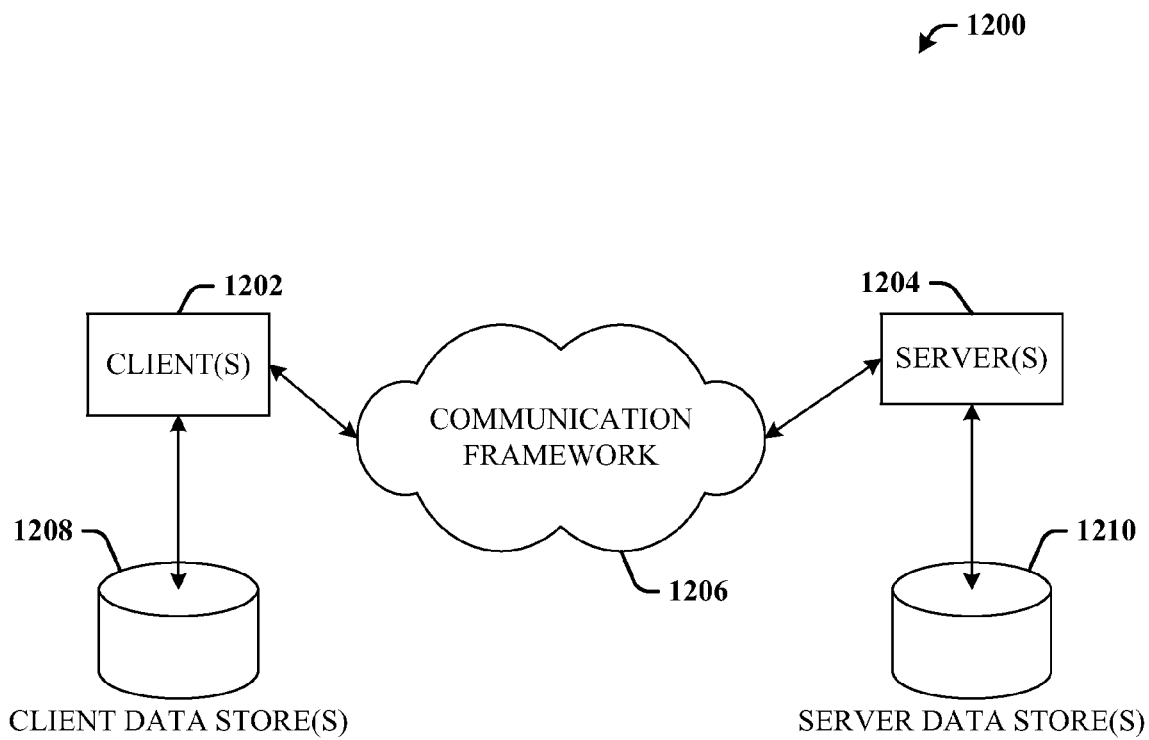
FIG. 12 depicts a block diagram of an exemplary electronic communication environment for wireless communications according to other aspects.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the various embodiments, for example.

The system 1200 also includes one or more server(s) 1204. The server(s) 1204 can also be hardware and/or software (e.g., threads, processes, computing devices). The servers 1204 can house threads to perform transformations by employing the various embodiments, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
 a memory to store software components of a destination node; and
 a processor, coupled to the memory, that executes the software components, the software components comprising:
  an analysis component configured to determine that a source signal is received with an error at a relay node, the source signal being forwarded by the relay node as a relay signal to a destination node; and a correction component configured to generate soft decision information from the relay signal and employ the soft decision information in decoding of the source signal, in response to reception of the source signal with the error by the destination node, and reception of the source signal with the error by at least the relay node.

2. The system of claim 1, wherein the analysis component is further configured to reference an information flag transmitted with the relay signal.

3. The system of claim 2, wherein the information flag is one bit and indicates the relay node received the source signal either correctly or with the error.

4. The system of claim 1, the software components further comprising a reference component configured to execute a cyclic redundancy check to determine whether the destination node has received the source signal with the error or the relay signal with the error.

5. The system of claim 4, wherein the reference component is further configured to output a destination error status indicating whether the source signal is received with the error and whether the relay signal is received with the error.

6. The system of claim 5, wherein the cyclic redundancy check fails for the source signal or the relay signal in response to detection of another error related to the error associated with the source signal or the relay signal in a cyclic redundancy coding of the source signal or the relay signal, respectively.

7. The system of claim 1, the software components further comprising an initialization component configured to trigger the correction component to generate the soft decision information from the relay signal in response to reception of the source signal with the error by the destination node and reception of the source signal with the error by the relay node.

8. The system of claim 1, wherein the correction component is further configured to execute a maximum ratio combining algorithm, in response to reception of the source signal with the error by the destination node, reception of the source signal correctly by the relay node, and reception of the relay signal with the error by the destination node.

9. The system of claim 1, wherein the correction component is configured to combine the source signal with the soft decision information to mitigate error in decoding of the source signal.

10. The system of claim 1, wherein the correction component is configured to generate the soft decision information from a sign function of the relay signal and a reliability function of the source signal received at the relay node.

11. The system of claim 10, wherein the sign function is generated as a function of a symbol decoded from the relay signal being re-encoded and modulated.

12. The system of claim 10, wherein the reliability function is generated from an error probability function pertaining to a bit of the source signal based on channel state information pertaining at least to a source-to-relay channel.

13. The system of claim 12, wherein the reliability function is a bit-specific reliability calculated for the bit individually.

14. The system of claim 12, wherein the reliability function is a packet-specific reliability calculated as an average of all bits of a packet in which the symbol is transmitted.

15. The system of claim 12, wherein the reliability function is a channel-specific reliability calculated as an average of all bits of packets received by the relay node from the source node in error.

16. The system of claim 12, wherein the error probability function is based on a fading coefficient and an average signal-to-noise ratio of the source-to-relay channel, and based on a fading coefficient and an average signal to noise ratio of relay-to-destination channel.

17. The system of claim 1, wherein the correction component is configured to combine the source signal with the soft decision information with an algorithm comprising a form of:

$$L(x_S|y_{SD},y_{RD}) = 4 y_{SD} h_{SD} \bar{\gamma}_{SD} + \text{Sign}\{y_{RD}\} \cdot \text{Rel}\{y_{SR}\}$$

where $x_s$ is a symbol transmitted by the source node, $y_{SD}$ is the symbol received at the destination node from the source node, $y_{RD}$ is the symbol received at the destination node from the relay node, $y_{SR}$ is the symbol received at the relay node from the source node, $h_{SD}$ is the fading coefficient of a source-to-destination channel, $\bar{\gamma}_{SD}$ is average signal-to-noise ratio of the source to destination channel, $\text{Sign}\{y_{RD}\}$ is defined as a modulated and coded hard-decision bit decoded from $y_{RD}$, and $\text{Rel}\{y_{SR}\}$ is defined as a reliability value of $y_{SR}$.

18. The system of claim 17, wherein the reliability value is derived from at least one of a bit-specific reliability function, a channel-specific reliability function or a packet-specific reliability function.

19. The system of claim 1, wherein the relay node, a source node and the destination node employ a coded cooperation mode, and further wherein:
  the analysis component is configured to receive a direct transmission from the relay node and a forwarded copy of the direct transmission from the source node and determine that the source node decoded the direct transmission from the relay node with the error or without the error; and
  the correction component is configured to generate the soft decision information from the forwarded copy of the direct transmission to mitigate error in decoding of the direct transmission.

20. The system of claim 1, wherein the correction component is configured to derive the soft decision information from the relay signal and the source signal.

21. The system of claim 20, wherein the correction component is configured to derive a reliability portion of the soft decision information from combined error probabilities of a source-to-relay channel and a relay-to-destination channel, in response to reception of the relay signal in error by the destination node.

22. The system of claim 1, wherein the relay node, a source node and the destination node form a network coded cooperation mode, and the software components further comprising:
  a logic component configured to separate a first set of data from a second set of data in the relay signal, the first set of data being transmitted for the destination node by the source node and received at the relay node and forwarded with the relay signal, wherein:
  the analysis component is configured to read an information flag bit included in the relay signal pertaining to the first set of data and determine that the first set of data had been received without error at the relay node, and
  the correction component is configured to use the first set of data to generate the soft decision information for the decoding of the source signal.

23. A method, comprising:
  receiving, by a system comprising at least a processor, a wireless symbol from a source node and receiving a forwarded version of the wireless symbol from a relay node;
  determining, by the system, whether the wireless symbol is received from the source node with a first error;

determining, by the system, whether the wireless symbol is received at the relay node from the source node with a second error; and generating, by the system, soft decision information from the forwarded version of the wireless symbol to mitigate decoding errors of the wireless symbol in response to determining the wireless symbol was received with the first error or the second error from the source node.

24. The method of claim 23, further comprising employing, by the system, a maximum ratio combining mechanism to decode the wireless symbol in response to determining the wireless symbol was received with the first error from by the destination node; determining, by the system, the forwarded version of the wireless symbol was received with a third error from the relay node at the destination node, and in response determining, by the system, the wireless symbol was received without error from the source node by the relay node.

25. The method of claim 23, further comprising generating, by the system, the soft decision information from a sign function and a reliability function of the forwarded version of the wireless symbol received at a destination node.

26. The method of claim 25, further comprising deriving, by the system, the sign function by decoding the forwarded version of the wireless symbol received at the destination node and re-encoding and modulating the forwarded version of the wireless symbol received at the destination node.

27. The method of claim 26, further comprising deriving, by the system, the reliability function for the forwarded version of the wireless symbol from a bit-specific, a packet-specific or a channel-specific error probability function.

28. The method of claim 27, further comprising multiplying, by the system, the sign function and the reliability function and summing a result of the multiplying with a log likelihood ratio value of the wireless symbol received from the source node.

29. The method of claim 28, further comprising determining, by the system, a value of a bit associated with the wireless symbol received from the source node from a result of the summing.

30. A system for wireless communication, comprising:
a receiver configured to receive respective wireless transmissions from a source transmitter and from a relay transmitter over a direct link and a relay link, respectively;
a signal decoder configured to decode a source symbol from a first transmission received over the direct link and a relay symbol from a second transmission over the relay link;
an analysis component configured to analyze the first transmission and the second transmission to identify a receive error in at least one of the respective wireless transmissions; and
a correction component configured to employ the relay symbol for generating soft information for a determination of a correct value of the source symbol in response to the analysis component identifying the receive error associated with reception of the source symbol by the relay transmitter.

31. The system of claim 30, further comprising an initialization component configured to trigger the correction component to generate the soft decision information in response to the analysis component additionally identifying the receive error associated with reception of the source symbol by the system.

32. The system of claim 30, further comprising a reference component configured to execute a cyclic redundancy check to determine whether the receive error is identified with the first transmission or is identified with the second transmission.

33. A system for wireless communication, comprising:
means for receiving a wireless symbol from a source node and a forwarded version of the wireless symbol from a relay node;
means for determining that the system receives the wireless symbol with a first error;
means for determining that the relay node receives the wireless symbol with a second error; and
means for generating soft decision information from the forwarded version of the wireless symbol in response to the system receiving the wireless symbol with the first error and the relay node receiving the wireless symbol with the second error.

34. The system of claim 33, wherein a cyclic redundancy check is employed at least in part for determining that the system receives the wireless symbol with the first error or for determining that the relay node receives the wireless symbol with the second error.

35. The system of claim 33, wherein a destination error status is output indicating whether the system receives the wireless symbol with the first error and whether the relay node receives the wireless symbol with the second error.

* * * * *